(12) United States Patent
Lee et al.

(10) Patent No.: US 8,155,070 B2
(45) Date of Patent: Apr. 10, 2012

(54) METHOD FOR RECEIVING ACK/NACK SIGNAL IN MOBILE COMMUNICATION SYSTEM

(75) Inventors: Dae Won Lee, Anyang-si (KR); Bong Hoe Kim, Anyang-si (KR); Young Woo Yun, Anyang-si (KR); Ki Jun Kim, Anyang-si (KR); Dong Wook Roh, Anyang-si (KR); Suk Hyon Yoon, Anyang-si (KR); Joon Kui Ahn, Anyang-si (KR); Dong Youn Seo, Anyang-si (KR); Hak Seong Kim, Anyang-si (KR); Jung Hoon Lee, Anyang-si (KR); Eun Sun Kim, Anyang-si (KR); Sung Duk Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 12/450,209

(22) PCT Filed: Mar. 19, 2008

(86) PCT No.: PCT/KR2008/001547
§ 371 (c)(1),
(2), (4) Date: Dec. 22, 2009

(87) PCT Pub. No.: WO2008/115004
PCT Pub. Date: Sep. 25, 2008

(65) Prior Publication Data
US 2010/0098005 A1 Apr. 22, 2010

Related U.S. Application Data

(60) Provisional application No. 60/895,710, filed on Mar. 19, 2007, provisional application No. 60/915,098, filed on Apr. 30, 2007, provisional application No. 60/945,585, filed on Jun. 21, 2007, provisional application No. 60/955,019, filed on Aug. 9, 2007.

(30) Foreign Application Priority Data

Sep. 14, 2007 (KR) ........................ 10-2007-0093565

(51) Int. Cl.
*H04W 4/00* (2009.01)
(52) U.S. Cl. .......................... 370/329; 370/441; 370/479
(58) Field of Classification Search ........................ None
See application file for complete search history.

(56) References Cited

U.S. PATENT DOCUMENTS 5,870,391 A  2/1999  Nago
(Continued)

FOREIGN PATENT DOCUMENTS

EP  1 185 001  3/2002
(Continued)

OTHER PUBLICATIONS

Heung-Gyoon Ryu, "System Design and analysis SFBC CI-OFDM system against the nonlinear distortion and narrow interference", IEEE Transaction on Consumer Electronics, vol. 54, issue 2, May 2008, pp. 368-375.
(Continued)

*Primary Examiner* — Jianye Wu
(74) *Attorney, Agent, or Firm* — McKenna Long & Aldridge LLP

(57) ABSTRACT

A method for transmitting information of resources for use in transmission of ACK/NACK signals in a mobile communication system is disclosed. An example method for receiving ACK/NACK signals in a mobile communication system is also disclosed. When resources for transmission of data and resources for transmission of control information of the data are scheduled through virtual unit resources, the method identifies information of resources for receiving an ACK/NACK signal for transmission data mapped to information of at least one of a virtual unit resource allocated to the transmission data and a virtual unit resource allocated to control information of the transmission data, and receives the ACK/NACK signal for the transmission data through the information of resources for receiving the ACK/NACK signal.

24 Claims, 12 Drawing Sheets

U.S. PATENT DOCUMENTS

| | | |
|---|---|---|
| 6,452,936 B1 | 9/2002 | Shiino |
| 6,842,487 B1 | 1/2005 | Larsson |
| 7,315,577 B2 | 1/2008 | Shao |
| 7,336,633 B2 | 2/2008 | Kruys |
| 7,386,076 B2 | 6/2008 | Onggosanusi et al. |
| 2001/0005681 A1 | 6/2001 | Kim |
| 2001/0034236 A1 | 10/2001 | Tong et al. |
| 2003/0039227 A1 | 2/2003 | Kwak |
| 2003/0133426 A1 | 7/2003 | Schein et al. |
| 2004/0009780 A1 | 1/2004 | Dick et al. |
| 2004/0081131 A1 | 4/2004 | Walton et al. |
| 2004/0190640 A1 | 9/2004 | Dubuc et al. |
| 2005/0083977 A1 | 4/2005 | Moulsley et al. |
| 2005/0117536 A1 | 6/2005 | Cho et al. |
| 2005/0122898 A1 | 6/2005 | Jang et al. |
| 2005/0220000 A1 | 10/2005 | Kim et al. |
| 2005/0232181 A1 | 10/2005 | Park et al. |
| 2005/0233754 A1 | 10/2005 | Beale |
| 2006/0045001 A1 | 3/2006 | Jalali |
| 2006/0198294 A1 | 9/2006 | Gerlach |
| 2006/0209814 A1 | 9/2006 | Fujii |
| 2006/0250941 A1 | 11/2006 | Onggosanusi et al. |
| 2006/0264218 A1 | 11/2006 | Zhang et al. |
| 2007/0110104 A1 | 5/2007 | Sartori et al. |
| 2007/0149137 A1 | 6/2007 | Richardson et al. |
| 2007/0183533 A1 | 8/2007 | Schmidl et al. |
| 2007/0184849 A1 | 8/2007 | Zheng |
| 2007/0206559 A1 | 9/2007 | Cho et al. |
| 2007/0208986 A1* | 9/2007 | Luo et al. ............... 714/752 |
| 2007/0258373 A1 | 11/2007 | Frederiksen et al. |
| 2007/0258540 A1 | 11/2007 | Ratasuk et al. |
| 2008/0025247 A1 | 1/2008 | McBeath et al. |
| 2008/0095106 A1* | 4/2008 | Malladi et al. ............. 370/329 |
| 2008/0225784 A1* | 9/2008 | Tseng ..................... 370/329 |
| 2008/0253469 A1 | 10/2008 | Ma et al. |
| 2008/0304593 A1 | 12/2008 | Khan et al. |
| 2008/0310483 A1 | 12/2008 | Lee et al. |
| 2009/0059884 A1 | 3/2009 | Zhang et al. |
| 2009/0060081 A1 | 3/2009 | Zhang et al. |
| 2009/0154580 A1 | 6/2009 | Ahn et al. |
| 2009/0196279 A1 | 8/2009 | Kim et al. |
| 2009/0274037 A1 | 11/2009 | Lee et al. |
| 2009/0285163 A1 | 11/2009 | Zhang et al. |
| 2009/0310719 A1 | 12/2009 | Stirling-Gallacher |
| 2009/0323615 A1 | 12/2009 | Ihm et al. |
| 2010/0034163 A1 | 2/2010 | Damnjanovic et al. |
| 2010/0260164 A1 | 10/2010 | Moon et al. |

FOREIGN PATENT DOCUMENTS

| | | |
|---|---|---|
| EP | 1 248 485 | 10/2002 |
| EP | 1746810 A2 | 1/2007 |
| EP | 1746855 A2 | 1/2007 |
| JP | 2002-369258 | 12/2002 |
| JP | 2004-312291 | 11/2004 |
| JP | 2004-364321 | 12/2004 |
| JP | 2005-244960 | 9/2005 |
| JP | 2005-253073 | 9/2005 |
| JP | 2005-288300 | 10/2005 |
| JP | 2006-166382 | 6/2006 |
| JP | 2007-124682 | 5/2007 |
| JP | 2007-221755 | 8/2007 |
| JP | 2008-053858 | 3/2008 |
| JP | 2008-092051 | 4/2008 |
| JP | 2008-092377 | 4/2008 |
| JP | 2008-236018 | 10/2008 |
| JP | 2009-522911 | 6/2009 |
| JP | 2010-506505 | 2/2010 |
| JP | 2011-193521 | 9/2011 |
| KR | 10-1999-013366 | 2/1999 |
| KR | 10-2002-009079 | 2/2002 |
| KR | 10-2002-0088085 | 11/2002 |
| KR | 10-2003-0081464 | 10/2003 |
| KR | 10-2005-0021965 | 3/2005 |
| KR | 10-2005-0043302 | 5/2005 |
| KR | 10-2005-0073256 | 7/2005 |
| KR | 10-2005-0120244 | 12/2005 |
| KR | 10-2006-0016600 | 2/2006 |
| KR | 10-2006-0092055 | 6/2006 |
| KR | 10-2006-0081352 | 7/2006 |
| KR | 10-2006-0095576 | 8/2006 |
| KR | 10-2007-0107614 | 11/2007 |
| KR | 10-2008-0023664 | 3/2008 |
| KR | 10-2008-0030905 | 4/2008 |
| KR | 10-2008-0039772 | 5/2008 |
| KR | 10-2008-0065853 | 7/2008 |
| KR | 10-2008-0096088 | 10/2008 |
| KR | 10-0894142 | 4/2009 |
| KR | 10-2009-0082843 | 7/2009 |
| RU | 2142672 C1 | 12/1999 |
| RU | 2221335 C2 | 1/2004 |
| RU | 2004131847 | 5/2005 |
| RU | 2267225 | 12/2005 |
| WO | WO 03/043245 | 5/2003 |
| WO | WO 03/077579 A1 | 9/2003 |
| WO | WO 03/085858 | 10/2003 |
| WO | WO 2004/038991 A2 | 5/2004 |
| WO | WO 2004/049591 A1 | 6/2004 |
| WO | WO 2005/006250 A1 | 1/2005 |
| WO | WO 2005/020875 | 6/2005 |
| WO | WO 2005/060132 A1 | 6/2005 |
| WO | WO 2005/062550 | 7/2005 |
| WO | WO 2005/065062 A2 | 7/2005 |
| WO | WO 2005/074184 | 8/2005 |
| WO | WO 2005/088869 | 9/2005 |
| WO | WO 2005/099123 | 10/2005 |
| WO | WO 2005/119959 | 12/2005 |
| WO | WO 2005/125140 | 12/2005 |
| WO | WO 2005/125140 A1 | 12/2005 |
| WO | WO 2006/023192 | 3/2006 |
| WO | WO 2006/069299 | 6/2006 |
| WO | WO 2006/073284 A1 | 7/2006 |
| WO | WO 2006/102771 A1 | 10/2006 |
| WO | WO 2007/007380 | 1/2007 |
| WO | WO 2007/049208 | 5/2007 |
| WO | WO 2007/052941 | 5/2007 |
| WO | WO 2007/078146 | 7/2007 |

OTHER PUBLICATIONS

Heung-Gyoon Ryu et al., "Design and Performance Evaluation of the MIMO SFBC CI-OFDM Communication System" Fourth International Conference on Wireless and Mobile comm., 2008, pp. 60-64.

"3rd Generation Partnership Project; Technical Specification Group Radio Access Network; LTE Physical Layer—General Description", 3GPP TS 36.201, Jun. 2007, pp. 1-12, XP050380347.

Panasonic: "Mapping position of control channel for Uplink SC-FDMA", TSG-RAN WG1 #43, R1-051395, Nov. 2005, XP002450961.

Wei Zhang et al., "Universal Space-Frequency Block Coding for MIMO-OFDM System", IEEE, 2005, pp. 227-231, 2005 Asia-Pacific Conference on Communications, Perth, Western, Australia.

Min Zhabg et al., "Space-Frequency Block Code with Matched Rotation MIMO-OFDM System with Limited Feedback", EURASIP Journal on Advance Signal Processing Publication, pp. 1-15, 24, Jun. 2009 (accepted date).

Liu K J R et al.;"Obtaining Full-Diversity Space-Frequency Codes From Space-Time Codes Via Mapping;" IEEE Transaction on Signal Processing, IEEE Service CEnter, New York, US, vol. 51, No. 11, Nov. 2003, pp. 2905-2916.

Samsung; "R1-72238 Transmit Diversity for 4-Tx Antenna;" May 2, 2007, pp. 1-6, 1, XP002578959.

Il Gyu Kim et al.; "Transmit Diversity and Multiplexing Methods for 3G-LTE Downlink Control Channels;" 2006 IEEE 64th Vehicular Technology Conference; VTC 2006-Fall; Sep. 25-28, 2006; Montreal, Quebec, Canada; Piscataway, NJ; (Sep. 1, 2006); pp. 1-4; XP031051218.

Wei Zhang et al.; "Space-Time/Frequency Coding for MIMO-OFDM in Next Generation Broadband Wireless Systems;" IEEE Wireless Communications, IEEE Service Center, Piscataway, NJ, US; vol. 14; No. 3; Jun. 1, 2007; pp. 32-43.

LG Electronics: "Downlink resource allocation for localized and distributed transmission", 3GPP TSG RAN WG1 #48bis, Malta, Mar. 26-30, 2007, R1-071549.

Texas Instruments: "Shared Control Channel Structure and Coding for E-UTRA Downlink", 3GPP TSG RAN WG1 LTE AdHoc, Cannes, Frances, Jun. 27-30, 2006, R1-061740.

Stefan Kaiser: "Space Frequency Block Coding in the Uplink of Broadband MC-CDMA Mobile Radio Systems with Pre-Equalization", Vehicular technology Conferece, 2003, VTC 2003-Fall, XP-107701084.

LG Electronics: "Downlink Cat0 signaling for scheduling assignments", 3GPP TSG RAN WG1 #47bis, Sorrento, Italy, Jan. 15-19, 2007, R1-070247.

LG Electronics: "Downlink ACK/NACK Index Mapping", 3GPP RAN WG1 #48 Bis, St. Juilans, Malta, Mar. 26-30, 2007, XP-002660818, R1-071552.

Qualcomm Europe: "Considerations on Multiplexing of Control and User data for xFDMA based E-UTRA Uplink Evaluation", 3GPP RSG-RAN WG1 #42 bis, Oct. 10-14, 2005, San Diego, California, XP-002446638, R1-051102.

LG Electronics: "Uplink ACK/NACK Index Mapping", 3GPP RAN WG1 #48bis, St. Julians, Malta, Mar. 26-30, 2007, XP-002660822, R1-071547.

Panasonic: "Assignment of Downlink ACK/NACK channel", 3GPP TSG-RAN WG1 Meeting #49bis, Orlando, Florida, Jun. 25-29, 2007, XP-002660823, R1-072794.

NTT DoCoMo et al.: "Comparison between RB-level and Sub-carrier-level Distributed Transmission for Shared Data channel in E-UTRA Downlink", 3GPP TSG RAN WG1 Meeting #46, Tallinn, Estonia, R1-062089, Aug. 28-Sep. 1, 2006.

Ericsson et al. "Way Forward on Downlink Control Signaling", 3GPP TSG RAN WG1 Meeting #48, Feb. 12, 2007, R1-071223.

NTT DoCoMo, et al. "Downlink L1/L2 Control Signaling Channel Structure: Mapping", 3GPP TSG RAN WG Meeting #47bis, Sorrento, Italy, Jan. 15-19, 2007, R1-070104.

NEC Group "Efficient Downlink ACK/NACK signalling for E-UTRA", TSG RAN WG1 Meeting #48bis, Mar. 26-30, 2007, Malta, R1-071508.

Huawei "E-UTRA Downlink L1/L2 Control Channel Structure", 3GPP TSG-RAN-WG1 Meeting #48bis, Mar. 26-30, 2007, Malta, R1-071689.

* cited by examiner

Use Differentty Ordered ACK/NACK Index Group

Precoding Matrix

Precoding Column Vector

METHOD FOR RECEIVING ACK/NACK SIGNAL IN MOBILE COMMUNICATION SYSTEM

This application claims priority to International Application No. PCT/KR2008/001547 filed on Mar. 19, 2008, which claims priority to Provisional Application No. 60/895,710 filed on Mar. 19, 2007, Provisional Application No. 60/915,098 filed on Apr. 30, 2007, Provisional Application No. 60/945,585 filed on Jun. 21, 2007, Provisional Application No. 60/955,019 filed on Aug. 9, 2007 and Korean Patent Application No. 10-2007-0093565 filed on Sep. 14, 2007, all of which are incorporated by reference for all purposes as if fully set forth herein.

TECHNICAL FIELD

The present disclosure relates to a mobile communication system, and more particularly, to transmission and reception of an ACK/NACK signal to acknowledge the receipt of data in a mobile communication system, especially, to a method for transmitting information of resources to be used for transmission and reception of ACK/NACK signals.

BACKGROUND ART

In a multi-carrier communication system, a base station controls data to be transmitted to each terminal through downlink and also controls data that each terminal transmits to the base station through uplink. The base station transmits control information to each terminal in order to control downlink/uplink data transmission. This control information is transmitted to the terminal through part of downlink resources.

The control of uplink/downlink data transmission at the base station can be referred to as scheduling and control of limited wireless resources for multiple terminals or services can be referred to as wireless resource scheduling. Wireless resource scheduling can be performed through actual unit resources used for data transmission. In this case, unit resources for scheduling at the base station and physical unit resources used for actual data transmission can be considered identical.

FIG. 1 illustrates an example of use of wireless resources in a multi-carrier system.

It can be seen from FIG. 1 that wireless resources of uplink and downlink, i.e., time-frequency resources, are used for data transmission. It can also be seen that downlink wireless resources are used not only for transmission of data but also for transmission of control information for controlling the downlink/uplink data transmission described above.

The terminal can receive downlink data by receiving control information transmitted from the base station through downlink wireless resources and obtaining information of wireless resources or the like of the data transmitted to the terminal through downlink wireless resources. The terminal can transmit uplink data by receiving control information transmitted from the base station through downlink wireless resources and obtaining information of wireless resources or the like of the data to be transmitted from the terminal to the base station through uplink wireless resources. Although not illustrated in FIG. 1, each terminal can also transmit control information through uplink wireless resources to notify the base station of its channel state, data receiving state, terminal state, etc.

Each receiving side of data can transmit an ACK/NACK signal for the data to notify the transmitting side whether or not the receiving side has normally received the data having been transmitted from a base station to a terminal through downlink or transmitted from a terminal to a base station through uplink.

More specifically, to increase the reliability of data communication, the receiving side transmits a positive acknowledgement (ACK) when the data has been received normally and transmits a negative acknowledgement (NACK) when the data has not been received normally.

The ACK/NACK signal occupies physical frequency and time resources since it is transmitted through downlink or uplink. When the terminal has transmitted an ACK/NACK signal through uplink in response to data transmitted from the base station through downlink, the base station needs to know the position of a resource through which the terminal has transmitted the ACK/NACK signal for the data. On the other hand, when the base station has transmitted an ACK/NACK signal, the terminal needs to know the position of a resource through which the ACK/NACK signal has been transmitted.

DISCLOSURE

Technical Problem

An object of the present disclosure devised in view of the above circumstances in the background art lies in providing a method for transmitting an ACK/NACK signal to acknowledge the receipt of data in a mobile communication system.

Another object of the present disclosure devised to solve the problem lies in providing a method for determining information of resources to be used for ACK/NACK transmission.

A further object of the present disclosure devised to solve the problem lies in providing a method for providing information of resources to be used for ACK/NACK transmission in a mobile communication system.

Technical Solution

The object of the present invention can be achieved by providing a method for receiving an ACK/NACK signal in a mobile communication system, the method including receiving reference signal information and a resource block index corresponding to a resource block allocated for transmission of data; identifying ACK/NACK resource information through the reference signal information and the resource block index; and receiving an ACK/NACK signal for the data using the ACK/NACK resource information.

The resource block index may be a lowest one among resource block indexes for the data.

The reference signal information may be a cyclic shift value for a specific sequence. Here, the specific sequence and a sequence cyclically shifted by the cyclic shift value may be orthogonal to each other or have good cross-correlation characteristics.

The reference signal may be allocated (or selected) from a reference signal set including a plurality of reference signals.

The number of resource blocks allocated to the data may be equal to or larger than a rank value applied to the mobile communication system.

In another aspect of the present invention, provided herein is a method for receiving an ACK/NACK signal in a mobile communication system, the method including identifying an ACK/NACK resource index of transmission data mapped to a resource block index allocated for transmission of a control channel of the transmission; and receiving an ACK/NACK signal for data associated with the control channel using a resource block corresponding to the ACK/NACK resource index, wherein at least one ACK/NACK resource index is repeatedly mapped (or double-mapped) to a plurality of resource block indexes.

The ACK/NACK resource index may be repeatedly mapped to the plurality of resource block indexes in units of specific ACK/NACK resource index sets.

The ACK/NACK resource index in the specific ACK/NACK resource index set may be repeatedly mapped to the plurality of resource block indexes using a different mapping rule.

The ACK/NACK resource index in the specific ACK/NACK resource index set may be repeatedly mapped so as to avoid collision of ACK/NACK resources used in actual transmission.

The resource block index may be a lowest one among resource block indexes of resource blocks allocated to the control information.

In another aspect of the present invention, provided herein is a method for receiving an ACK/NACK signal in a mobile communication system, the method including identifying an ACK/NACK resource index of transmission data mapped to a resource block index allocated to control information of the transmission data; and receiving an ACK/NACK signal for the transmission data using the ACK/NACK signal resource index, wherein the same ACK/NACK resource index is repeatedly mapped to at least one resource block index.

Preferably, a plurality of resource block indexes are mapped to the at least one ACK/NACK index using a different mapping rule for each of the plurality of resource block indexes.

Advantageous Effects

According to the method for transmitting ACK/NACK signals in a mobile communication system described in the present disclosure, it is possible to efficiently obtain information of resources of the ACK/NACK signals. It is also possible to more efficiently use resources for transmission of ACK/NACK signals.

According to the method, it is also possible to easily allocate resources for transmission of ACK/NACK signals in a mobile communication system. The amount of control information can also be reduced since separate information of resources for transmission and reception of ACK/NACK signals is not transmitted.

It is also possible to easily extend resources for transmission of ACK/NACK signals in a communication system that employs a MIMO technique. In addition, it is possible to increase the reliability of data communication through ACK/NACK signals.

MODE FOR INVENTION

Figure 1:
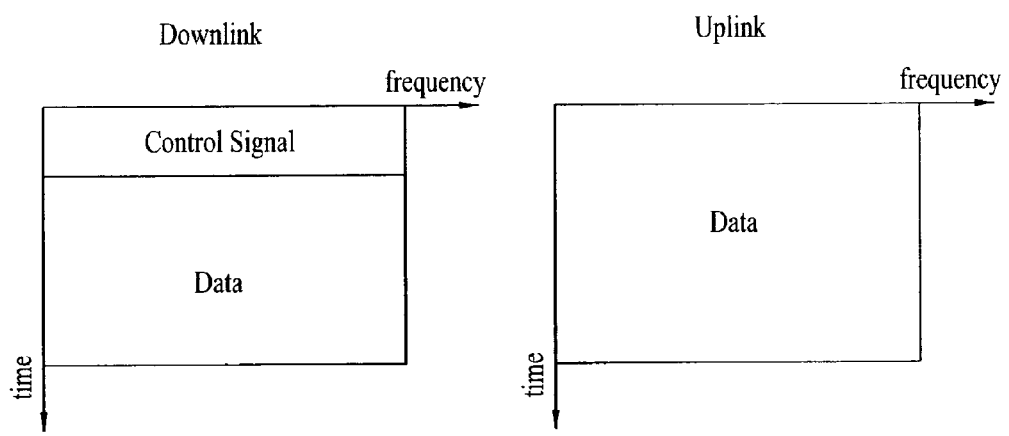
FIG. 1 illustrates an example of use of wireless resources in a multi-carrier system.

Reference will now be made in detail to the preferred embodiments of the present invention, examples of which are illustrated in the accompanying drawings.

To allow multiple terminals to transmit/receive data using common resources, a base station can determine wireless resources to be used by each terminal and inform the user of the determined wireless resources through scheduling. Here, the base station can control resources for reception/transmission of data through logical resources which are referred to as virtual unit resources. The virtual unit resources, which are logical resources, are in one-to-one correspondence with physical resources according to a specific rule.

The embodiments of the invention described below are characterized in that the base station does not perform wireless resource scheduling using actual unit resources used for data transmission and, instead, performs scheduling indirectly using virtual unit resources. In this case, a specific relation is established between virtual unit resources and actual physical unit resources used for scheduling at the base station, and, if the base station schedules wireless resources based on the virtual unit resources, then transmission data is mapped to actual physical unit resources based on the scheduling so that the transmission data is transmitted to the receiving side through the mapped actual physical unit resources.

As described above, since ACK/NACK signals are transmitted through specific resources in uplink/downlink as described above, the receiving side can transmit an ACK/NACK signal only when it knows resources through which the ACK/NACK signal is transmitted. The transmitting side can also associate an ACK/NACK signal with data transmitted in uplink/downlink only when it knows resources through which the ACK/NACK signal is transmitted.

For example, to receive an ACK/NACK signal for transmission data (or transmitted data), the transmitting side infers information of a resource(s) for receiving the ACK/NACK signal for the transmission data using information of virtual unit resources allocated to the transmission data or virtual unit resources allocated to control information of the transmission data. The transmitting side can receive the ACK/NACK signal for the transmission data using the information of resources for receiving the ACK/NACK signal.

The receiving side transmits an ACK/NACK signal for received data according to a similar method. Specifically, the receiving side can infer information of resources for transmitting an ACK/NACK signal for transmission data using information of virtual unit resources allocated to the transmission data or virtual unit resources allocated to control information of the transmission data and can transmit the ACK/NACK signal for the transmission data using the information of resources for transmitting the ACK/NACK signal.

In addition, a set of virtual unit resources can be allocated to transmission data or control information of the transmission data. In this case, the transmitting side can determine information of resources for transmitting the ACK/NACK signal through a virtual unit resource included in the virtual unit resource set and can receive the ACK/NACK signal using the determined information.

In the following description, it is assumed that ACK/NACK signals are transmitted through specific unit resources of uplink/downlink, and resource numbers are allocated to unit resources, through which the ACK/NACK signals are transmitted, and the allocated resource numbers are used for the unit resources. Resource numbers allocated to unit resources through which ACK/NACK signals are transmitted in uplink/downlink are referred to as ACK/NACK indexes. In this case, the receiving side, which is the base station or terminal, can transmit an ACK/NACK signal for received data using an ACK/NACK index and the transmitting side, which is the terminal or base station, can determine which data corresponds to the ACK/NACK signal received from the receiving side.

First Embodiment

One example of the virtual unit resource is a Virtual Resource Block (VRB). The VRB is a virtual unit resource for data transmission. The VRB includes multiple Resource Elements (REs). If it is assumed that an actual physical unit resource is a Physical Resource Block (PRB), the number of REs included in one VRB is equal to the number of REs included in one PRB. In actual data transmission, one VRB can be mapped to one PRB or can be mapped to a partial region of multiple PRBs. The term "VRB" will naturally be used interchangeably with the term "PRB" when one VRB is mapped to one PRB in the following description.

Scheduling of downlink data transmission from the base station to a specific terminal or uplink data transmission from a specific terminal to the base station is performed through one or more VRBs in one subframe. When the base station transmits downlink data to a specific terminal, the base station informs the terminal of a downlink VRB through which the base station will transmit the data. In addition, to allow a specific terminal to transmit uplink data, the base station informs the specific terminal of an uplink VRB through which the terminal can transmit the data.

This embodiment provides a method in which, for example, VRB information is used for obtaining or transmitting information of a correct resource position through which the receiving side is to transmit an ACK/NACK signal for received data in a multi-carrier system.

Figure 2:
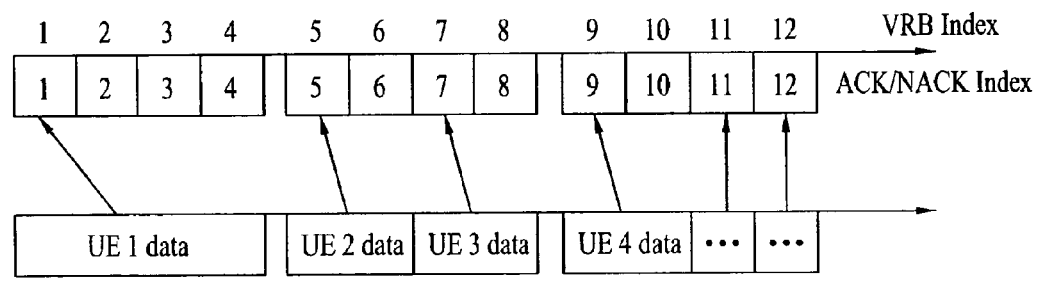
FIG. 2 illustrates a method for determining ACK/NACK indexes according to an embodiment of the invention.

FIG. 2 illustrates a method for determining ACK/NACK indexes according to an embodiment of the invention.

A resource number allocated to a VRB or a VRB position will now be referred to as a VRB index. According to this embodiment, when the transmitting side transmits data by allocating it to one or more VRBs, a relation is established between a VRB index and an ACK/NACK index(es) to allow the receiving side to obtain information of resources for transmitting/receiving an ACK/NACK signal for the transmitted data.

Specifically, FIG. 2 shows an example in which ACK/NACK indexes are allocated respectively to VRB indexes. The receiving side determines an ACK/NACK index using a VRB index of a VRB allocated for data transmission/reception. Using the determined ACK/NACK index, the receiving side can obtain information of an ACK/NACK resource for transmitting an ACK/NACK signal for received data.

As shown in FIG. 2, data of one terminal can be allocated to multiple VRBs through which the data can be transmitted. Transmission of one ACK/NACK signal is needed for single data. Therefore, when the transmitting side transmits data by allocating it multiple VRBs, the receiving side can select one of the respective VRB indexes of the multiple VRBs to which the data has been allocated and can transmit an ACK/NACK signal using a resource corresponding to an ACK/NACK index corresponding to the selected VRB index. For example, when the transmitting side transmits data by allocating it to multiple VRBs, the receiving side can transmit an ACK/NACK signal for the transmitted data using an ACK/NACK index corresponding to the smallest of the multiple VRBs.

Second Embodiment

Another example of the virtual unit resource is a Control Channel Element (CCE).

When a plurality of control channel information are transmitted using n OFDM symbols in a subframe serving as a transmission time interval, each CCE is transmitted by mapping to resource elements in the physical domain. A CCE is an entity constructed to transmit a plurality of control information of one terminal and the amount of control information transmittable through a CCE can be defined by a predefined coding rate and modulation method. A plurality of control information can be transmitted through one or more CCEs in order to provide a coding rate for achieving a specific reception quality to a terminal when a modulation method has been defined.

When the base station transmits data through downlink or receives data from a terminal, the base station can transmit control information to the terminal through one or more CCEs in order to notify the terminal of additional information of data/information or a resource position to which the data/information has been allocated. Each CCE is mapped to a resource in the downlink time-frequency domain. The CCE can be considered a minimum resource unit of control information for data transmission in each of downlink and uplink.

Using this control information, the terminal can determine, when receiving data from the base station, VRB resources used for receiving the data and can determine, when transmitting data to the base station, VRB resources in uplink which can be used to transmit the data.

The CCE is a logical resource conceptually similar to the VRB. Therefore, even though single control information is transmitted through a set of consecutive CCEs, it can be transmitted through discontinuous resources in actual physical resources. The relation between these logical/physical resources can be predefined in the system.

Different CCEs can be defined for control information for downlink data and control information for uplink data. That is, an independent CCE can be determined for each of uplink and downlink since the size of control information for downlink can be different from the size of control information for uplink.

In the case where data is transmitted through downlink, the base station transmits control information to a terminal, which will receive the data, through a CCE or a set of CCEs to notify the terminal of information of a VRB or a set of VRBs, through which the data is transmitted, and other additional control information. After receiving this control information, the terminal receives the data and transmits an ACK or NACK to the base station through uplink to acknowledge the receipt of the data.

In the case where data is transmitted through uplink, the base station transmits control information through a CCE or a set of CCEs to notify the terminal of information of uplink VRBs available to the terminal. After receiving this control information, the terminal transmits data using the uplink VRB information. After receiving the data, the base station transmits an ACK or NACK through downlink to notify the terminal whether or not the base station has received the data.

This embodiment provides a method in which, for example, CCE information is used for obtaining or transmitting information of a correct resource position through which the receiving side is to transmit an ACK/NACK signal for received data in a multi-carrier system.

Figure 3:
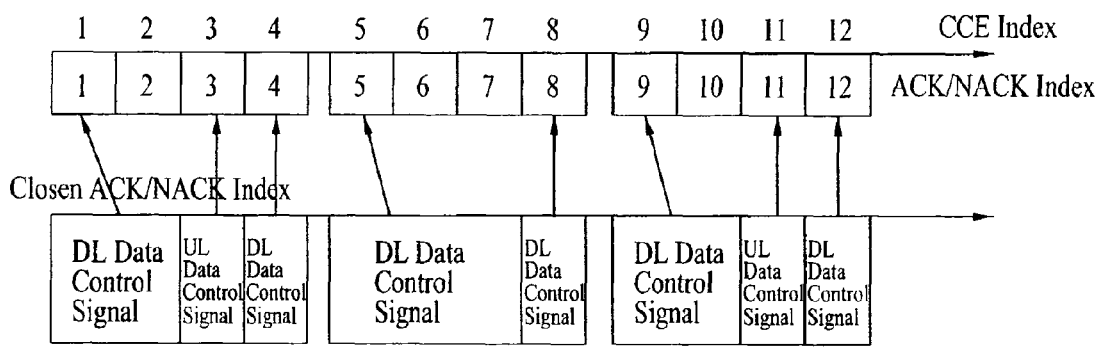
FIG. 3 illustrates a method for determining ACK/NACK indexes according to another embodiment of the invention.

FIG. 3 illustrates a method for determining ACK/NACK indexes according to another embodiment of the invention.

A resource number allocated to a CCE or a CCE position will now be referred to as a CCE index. According to this embodiment, when the transmitting side transmits control information of transmission data by allocating the control information to one or more CCEs, a relation is established between a CCE index and an ACK/NACK index to allow the receiving side to obtain information of resources for an ACK/NACK signal for the transmitted data.

Specifically, FIG. 3 shows an example in which ACK/NACK indexes are allocated respectively to CCE indexes. The receiving side can obtain an ACK/NACK index using a CCE index of a CCE allocated for control information transmission/reception. Using the obtained ACK/NACK index, the receiving side can obtain information of an ACK/NACK resource for transmitting an ACK/NACK signal for received data corresponding to the control information.

As shown in FIG. 3, control information of one terminal or data can be transmitted by allocating the controlling information to multiple CCEs. Generally, control information is transmitted to terminals at various locations and a mixture of a plurality of control information allocated to a set of CCEs is transmitted through downlink. However, when single control information is transmitted through a set of CCEs, one CCE index is selected from multiple CCE indexes occupied by the control information and an ACK/NACK signal is transmitted using an ACK/NACK index corresponding to the selected CCE index. For example, an ACK/NACK signal can be transmitted and received using an ACK/NACK index corresponding to the smallest of the CCE indexes occupied by the control information.

In the embodiment of FIG. 3, the base station can transmit ACK/NACK signals without collision of ACK/NACK resources since ACK/NACK indexes 1, 4, 5, 8, 9, and 12 are used for downlink data and ACK/NACK indexes 3 and 11 are used for uplink data.

Figure 4:
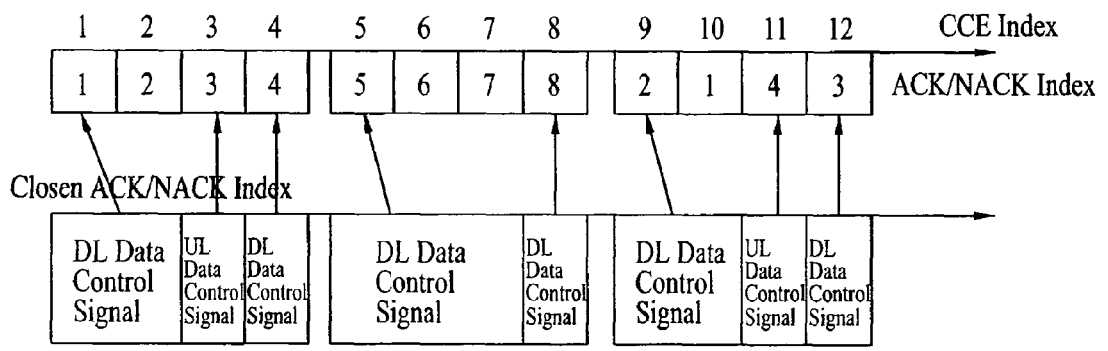
FIG. 4 illustrates a method for determining ACK/NACK indexes according to another embodiment of the invention.

FIG. 4 illustrates a method for determining ACK/NACK indexes according to another embodiment of the invention.

The amount (or number) of ACK/NACK resources that should be secured does not necessarily correspond to the number of CCE indexes since ACK/NACK signals of uplink and downlink are transmitted separately. For example, if ACK/NACK resources are allocated in advance for ACK/NACK indexes in one-to-one correspondence with CCE indexes, not all allocated ACK/NACK resources will be used and will be wasted in most situations.

Thus, repeated use of ACK/NACK indexes corresponding to CCE indexes will enable more efficient operation of ACK/NACK resources. That is, one ACK/NACK index may be repeatedly allocated (or double-allocated) to a plurality of CCE indexes. Here, it is preferable that the ACK/NACK index (i.e., ACK/NACK resource) not be used as an ACK/NACK resource for other control information.

As shown in FIG. 4, ACK/NACK indexes 1, 2, 3, and 4 mapped to CCE indexes 1, 2, 3, and 4 may be repeatedly used for CCE indexes 9, 10, 11, and 12. In the embodiment of FIG. 4, the base station can transmit ACK/NACK signals without collision of ACK/NACK resources even though ACK/NACK indexes are repeatedly used since ACK/NACK indexes 1, 4, 5, 8, 2, and 3 are used for downlink data and ACK/NACK indexes 3 and 11 are used for uplink data.

Reference will now be made in more detail to an example of the method for repeatedly allocating ACK/NACK indexes (i.e., ACK/NACK resources).

Figure 5:
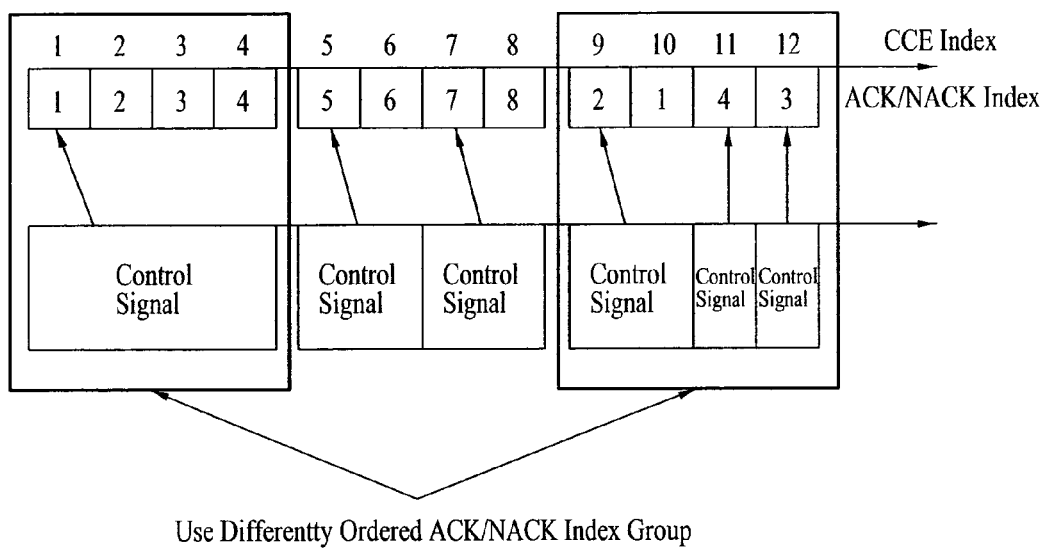
FIG. 5 illustrates a method for determining ACK/NACK indexes according to another embodiment of the invention.

FIG. 5 illustrates a method for determining ACK/NACK indexes according to another embodiment of the invention.

In this embodiment, ACK/NACK indexes mapped to information of a plurality of virtual unit resources included in a virtual unit resource set, which includes a largest number of virtual unit resources, are used as ACK/NACK indexes that are repeatedly mapped. Here, it is preferable that different mapping rules be applied when the same ACK/NACK indexes are mapped to virtual unit resource sets.

ACK/NACK indexes mapped to control information included in the largest CCE set can be referred to as an ACK/NACK Index Group (ANIG). When ACK/NACK indexes are repeatedly mapped to CCE indexes, they may be mapped on an ANIG basis (or in units of ANIGs). Here, it is preferable that ACK/NACK indexes in an ANIG be repeatedly mapped in a different correspondence when ACK/NACK indexes in an ANIG are repeatedly mapped to CCEs. That is, when ACK/NACK indexes are mapped to CCE indexes on a largest CCE set basis (or in units of the largest CCE set), ACK/NACK indexes in an ANIG mapped to a set of CCE indexes can be remapped to a different set of CCE indexes in a different mapping order.

If ACK/NACK indexes mapped to a set of CCE indexes are remapped to a different set of CCE indexes in a different mapping order in this manner, it is possible to more efficiently allocate ACK/NACK resources using CCE indexes when one or more control information are transmitted through CCEs.

As shown in FIG. 5, when it is assumed that the largest CCE set is a CCE set including four CCE indexes 1, 2, 3, and 4, ACK/NACK indexes (1, 2, 3, 4) are mapped to CCE indexes (1, 2, 3, 4) and CCE indexes (9, 10, 11, 12). However, ACK/NACK indexes (2, 1, 4, 3), which are ordered differently from (1, 2, 3, 4), are mapped to CCE indexes (9, 10, 11, 12).

While 12 ACK/NACK resources are necessary when different ACK/NACK indexes are allocated to all CCEs, ACK/NACK signals can be transmitted in each link using only 8

ACK/NACK resources if ACK/NACK indexes (1, 2, 3, 4) are repeatedly mapped to CCE indexes according to the method shown in FIG. 5.

In addition, information of resources for receiving uplink ACK/NACK signals and information of resources for receiving downlink ACK/NACK signals can be mapped separately from each other. The setting of ACK/NACK indexes illustrated in FIG. 5 can be considered a setting for either uplink or downlink. That is, an uplink ACK/NACK index and a downlink ACK/NACK index can be separately set for the same CCE as shown in FIG. 5.

Although a large number of CCEs can be actually transmitted in a multi-carrier system, the number of a plurality of control information that can be transmitted is not necessarily equal to the number of CCEs since the overall throughput of the system is not significantly reduced even if the number of a plurality of control information that can be transmitted at once is limited in the system. Accordingly, the number of ACK/NACK resources that are allocated may be different from the number of CCEs that can be transmitted in the multi-carrier system and may be equal to the number of a plurality of control information that are transmitted at once.

Third Embodiment

Reference will now be made to a method in which the ordinal information of a virtual unit resource of transmission data or control information of the transmission data in a single subframe is used as ACK/NACK resource information according to another embodiment of the invention.

In an example of this method, the ordinal number of a VRB, containing data of a corresponding terminal, in VRBs in a subframe is associated with an ACK/NACK index. Accordingly, the terminal can obtain an ACK/NACK index by determining the ordinal number of data (or control information) among a plurality of transmitted data using a VRB through which the data is transmitted.

In another example of the method, the ordinal number of control information among CCEs in a subframe may be associated with an ACK/NACK index. That is, when control information for uplink/downlink data transmission/reception is transmitted to a terminal, the terminal can obtain an ACK/NACK index by determining the ordinal number of the control information transmitted to the terminal among all uplink/downlink control information.

To efficiently implement this embodiment, it is preferable that the base station and the terminal share the number of a plurality of control information that the base station can transmit in a subframe and the plurality of control information be arranged in order of decreasing or increasing amount (or number) of CCE resources occupied by the control information.

Figure 6:
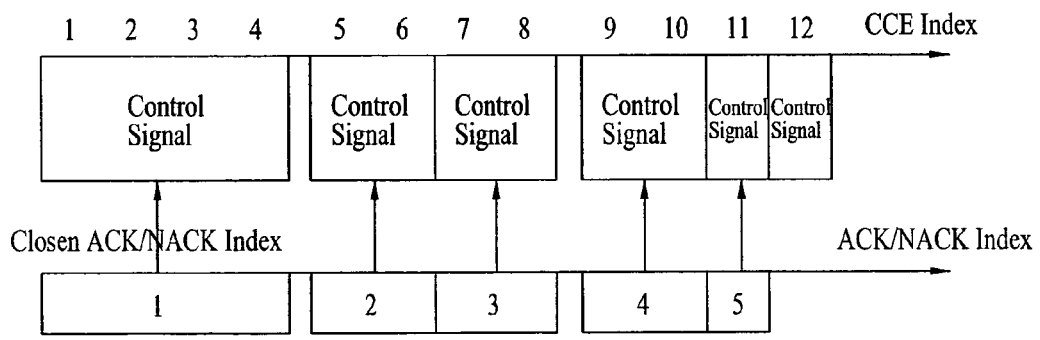
FIG. 6 illustrates a method for determining ACK/NACK indexes using the ordinal information of a virtual unit resource according to this embodiment of the invention.

FIG. 6 illustrates a method for determining ACK/NACK indexes using the ordinal information of a virtual unit resource according to this embodiment of the invention.

A description will now be given of a method in which the ordinal information of a virtual unit resource of transmission data or control information of the transmission data in a single subframe is used as ACK/NACK resource information according to this embodiment of the invention.

In an example of this method, the ordinal number of a VRB, containing data of a corresponding terminal, in VRBs in a subframe is associated with an ACK/NACK index. Accordingly, the terminal can obtain an ACK/NACK index by determining the ordinal number of data (or control information) among a plurality of transmitted data using a VRB through which the data is transmitted.

In another example of the method, the ordinal number of control information among CCEs in a subframe may be associated with an ACK/NACK index. That is, when control information for uplink/downlink data transmission/reception is transmitted to a terminal, the terminal can obtain an ACK/NACK index by determining the ordinal number of the control information transmitted to the terminal among all uplink/downlink control information.

To efficiently implement this embodiment, it is preferable that the base station and the terminal share the number of a plurality of control information that the base station can transmit in a subframe and the plurality of control information be arranged in order of decreasing or increasing amount (or number) of CCE resources occupied by the control information.

FIG. 6 shows an example of the allocation of ACK/NACK indexes to CCEs and the association between the ACK/NACK indexes and the allocated CCEs when 12 CCEs are present in downlink while the number of control information transmitted in a time interval occupying 4 CCEs is 1, the number of control information occupying 2 CCEs is 3, and the number of control information occupying one CCE is 1. In this example, the plurality of control information are arranged in order of decreasing amount of CCE resources occupied by the control information.

In the embodiment of FIG. 6, a first terminal receives control information having a size of two CCEs corresponding to CCE indexes 9 and 10. The first terminal already knows that a plurality of control information has been transmitted in order of decreasing size of control information and that the plurality of control information includes one control information of a size of four CCEs and three control information of a size of two CCEs. Accordingly, the first terminal can determine that the received control information is the fourth of the total of 5 control information transmitted. As a result, the first terminal can determine that transmission of an ACK/NACK signal for data controlled by the received control information uses an ACK/NACK resource corresponding to a fourth ACK/NACK index.

Fourth Embodiment

Reference will now be made to a method in which ACK/NACK resource information is transmitted by incorporation into transmission data or control information of the transmission data.

In this method, when a base station transmits control information for transmission and reception of data to a terminal, information indicating an ACK/NACK index used by the data is included in the data or the control information. For example, $N_{AN}$ bits may be added to control information to indicate an ACK/NACK index of the corresponding data/information. Using this method, the base station can directly control ACK/NACK resources used by all data. Accordingly, the base station can flexibly change the amount of resources to be used for ACK/NACK transmission according to circumstances.

Figure 7:
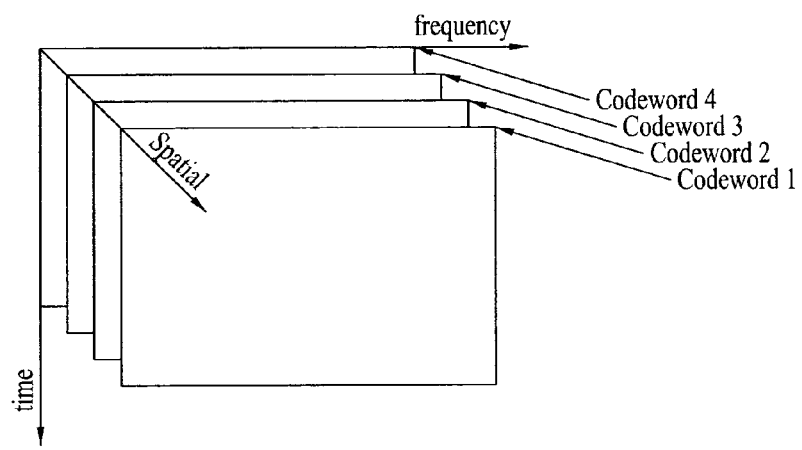
FIG. 7 illustrates resources, when a MIMO technique is used.

FIG. 7 illustrates resources when a MIMO technique is used.

When the MIMO technique is applied, it is possible to transmit data using diversity in the spatial domain in the same frequency and time resources. That is, the same time-frequency resources are shared by different data. Generally, a system which uses the MIMO technique uses a spatial multiplexing technique which is referred to as precoding.

When data is transmitted in a MIMO system, a data information block is converted into a decoded codeword. Therefore, one codeword can be considered one data information block. This codeword corresponds to a virtual antenna layer, and the antenna layer is associated with an actual transmit antenna port through precoding.

Figure 8:
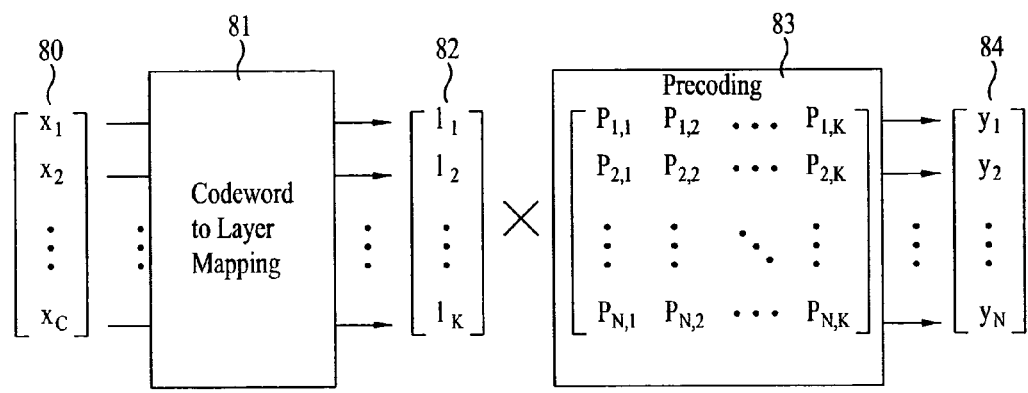
FIG. 8 illustrates a general procedure in which each codeword is transmitted to a transmit antenna of a MIMO system in a multi-carrier system to which the MIMO scheme is applied.

FIG. 8 illustrates a general procedure in which each codeword is transmitted to a transmit antenna of a MIMO system in a multi-carrier system to which the MIMO scheme is applied.

As shown in FIG. 8, each codeword 80 generally corresponds to a specific layer 82 through a codeword-layer mapping module 81 in a MIMO multi-carrier system. The number of codewords $N_C$ may not be equal to the number of layers $N_L$. How each codeword is mapped to a layer depends on which precoding matrix is used for precoding. The number of layers can be referred to as a rank.

Although ranks may not be equal in a total frequency band, generally, all frequency regions of data transmitted to a specific terminal in downlink have the same rank value and all frequency regions of data transmitted by the terminal in uplink also use the same rank value. In downlink, the rank value used in a total frequency band may significantly vary since the base station transmits data to multiple terminals in downlink.

A precoding module 83 for performing precoding can be represented by a $N_T \times N_L$ precoding matrix which is represented by $N_T$ column vectors having a length of $N_L$. Consequently, a layer to which each codeword is mapped can be determined according to one or more precoding column vectors which the codeword uses.

Figure 9:
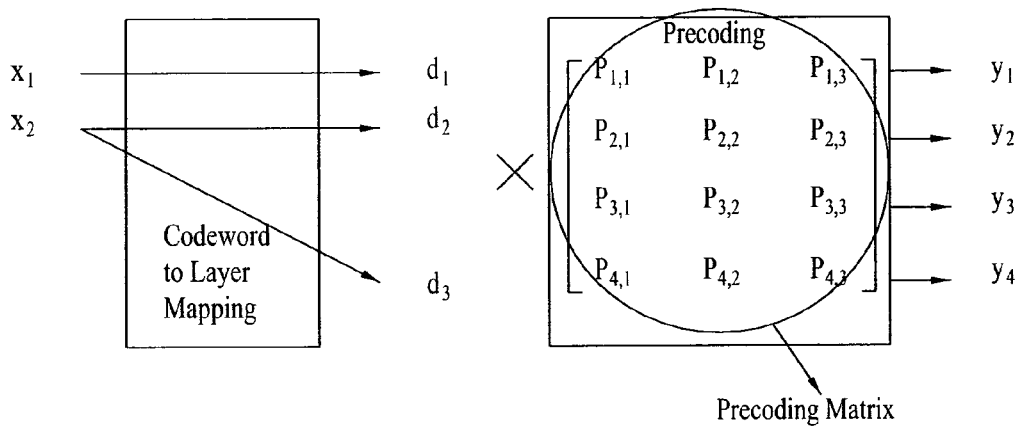
FIG. 9 illustrates an example where data corresponding to a codeword is connected to a transmit antenna port in a multi-carrier system to which a MIMO technique is applied.
Figure 10:
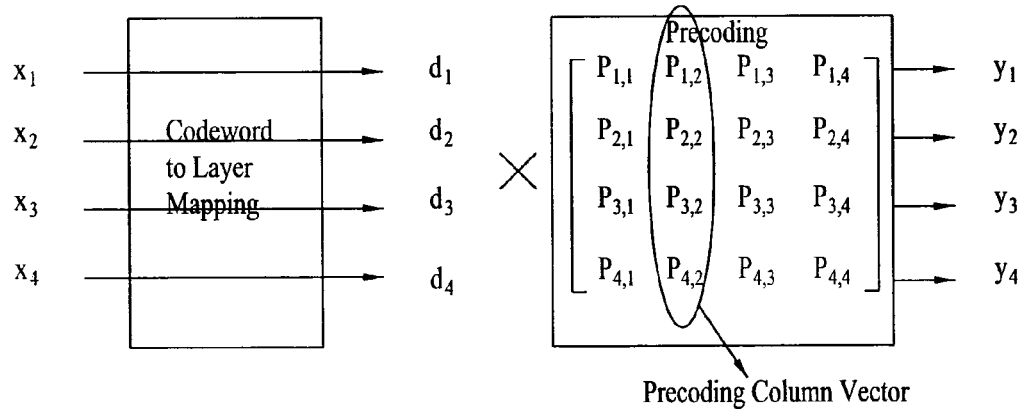
FIG. 10 illustrates another example where data corresponding to a codeword is connected to a transmit antenna port in a multi-carrier system to which a MIMO technique is applied.

FIG. 9 illustrates an example where data corresponding to a codeword is connected to a transmit antenna port in a multi-carrier system to which a MIMO technique is applied. FIG. 10 illustrates another example where data corresponding to a codeword is connected to a transmit antenna port in a multi-carrier system to which a MIMO technique is applied.

When the MIMO technique is applied to the multi-carrier system, it is possible to efficiently increase spatial resources in proportion to the rank according to the MIMO technique in frequency and time resources. This also has an advantage in that the amount of data transmitted is increased in proportion to the rank. However, this also increases the amount of corresponding ACK/NACK resources. That is, ACK/NACK signals, which are increased in number as the amount of data increases since the data is transmitted according to the MIMO technique, must be transmitted in the opposite link. However, increasing the amount of required ACK/NACK resources may reduce the efficiency of the multi-carrier system since ACK/NACK signals are not necessarily transmitted using the MIMO technique.

In the MIMO-based system, the number of ACK/NACK indexes which can be mapped through VRBs or CCEs may be more limited than the number of transmittable data. For example, it is assumed that VRB indexes and ACK/NACK indexes are mapped using the method described in the first embodiment. Even when the same time-frequency resources are used in the MIMO system, two or more codewords can be transmitted if spatial resources are divided and used. However, since VRB indexes are mapped to ACK/NACK indexes, the number of expressible ACK/NACK indexes is less than the number of transmittable data. This may also be true when a method, where CCE indexes are mapped to ACK/NACK indexes, is used.

In addition, a plurality of codewords can be transmitted in a system which uses the MIMO technique as described above. Here, the number of codewords transmitted through the same time-frequency resources may vary depending on wireless channel environments. Accordingly, the association of ACK/NACK resources when multiple codewords are transmitted and when one codeword is transmitted may become indefinite.

The following embodiments suggest methods in which a terminal can obtain an ACK/NACK index which is a unique number of an ACK/NACK resource through which an ACK/NACK signal is transmitted and received in a system using a MIMO technique. The methods according to the embodiments will not necessarily be used in a MIMO system.

Fifth Embodiment

According to this embodiment, an ACK/NACK index of transmission data can be mapped to a combination of information of a virtual unit resource allocated to the transmission data or a virtual unit resource allocated to control information of the transmission data and additional information. For example, the number of possible ACK/NACK indexes when a MIMO technique is applied to the multi-carrier communication system may be less than the number of transmittable data. By incorporating additional information, it is possible to increase the limited number of ACK/NACK indexes that can be mapped through VRBs or CCEs.

The following is a method for determining ACK/NACK indexes according to this embodiment. In the above embodiments where no MIMO is considered, an ACK/NACK index is transmitted by mapping to virtual unit resource information, for example a VRB index or a CCE index. This embodiment described below provides a method in which an offset index is used as additional information. That is, an ACK/NACK index can be obtained using a combination of a VRB index or CCE index and an offset index.

In this case, information of an offset index can be provided to a terminal when a base station transmits multiple codewords. The offset index information may also be provided using information shared by both the base station and the terminal without transmission of additional information. The offset index information may also be predefined in the system. The offset index value may be negative.

Equations 1 and 2 show example methods in which ACK/NACK indexes are determined by combining VRB indexes and CCE indexes with offset indexes, respectively.

$$I_{ACK/NACK} = I_{offset} + I_{VRB}, I_{VRB} = 0, 1, 2, \ldots, N_{VRB-1} \quad \text{EQUATION 1}$$

$$I_{ACK/NACK} = I_{offset} + I_{CCE}, I_{CCE} = 0, 1, 2, \ldots, N_{CCE-1} \quad \text{EQUATION 2}$$

"$I_{VRB}$" in Equation 1 denotes a VRB index and "$I_{CCE}$" in Equation 2 denotes a CCE index. $I_{VRB}$ and $I_{CCE}$ may have an integer in the ranges of 0 to $N_{VRB}-1$ and $N_{CCE}-1$, respectively. Here, $N_{VRB}$ denotes the total number of indices $I_{VRB}$ and $N_{CCE}$ denotes the total number of indices $I_{CCE}$. Especially, it is assumed that the VRB index or CCE index is smallest when a number of VRBs or CCEs are allocated to single data or control information. In Equations 1 and 2, $I_{offset}$ denotes an offset index and $I_{ACK/NACK}$ denotes an ACK/NACK index.

Figure 11:
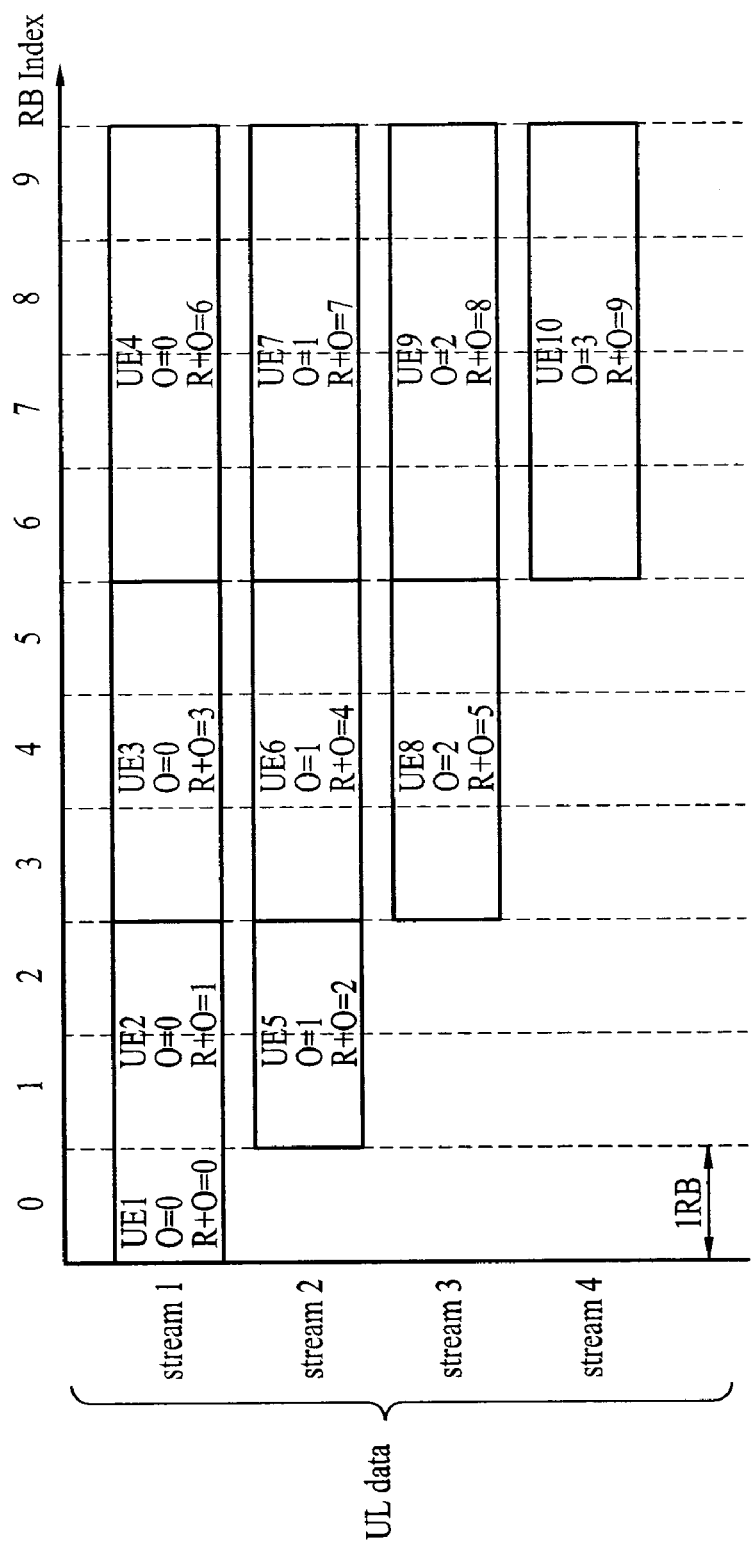
FIG. 11 illustrates a method in which an offset index is additionally used according to another embodiment of the invention.
Figure 12:
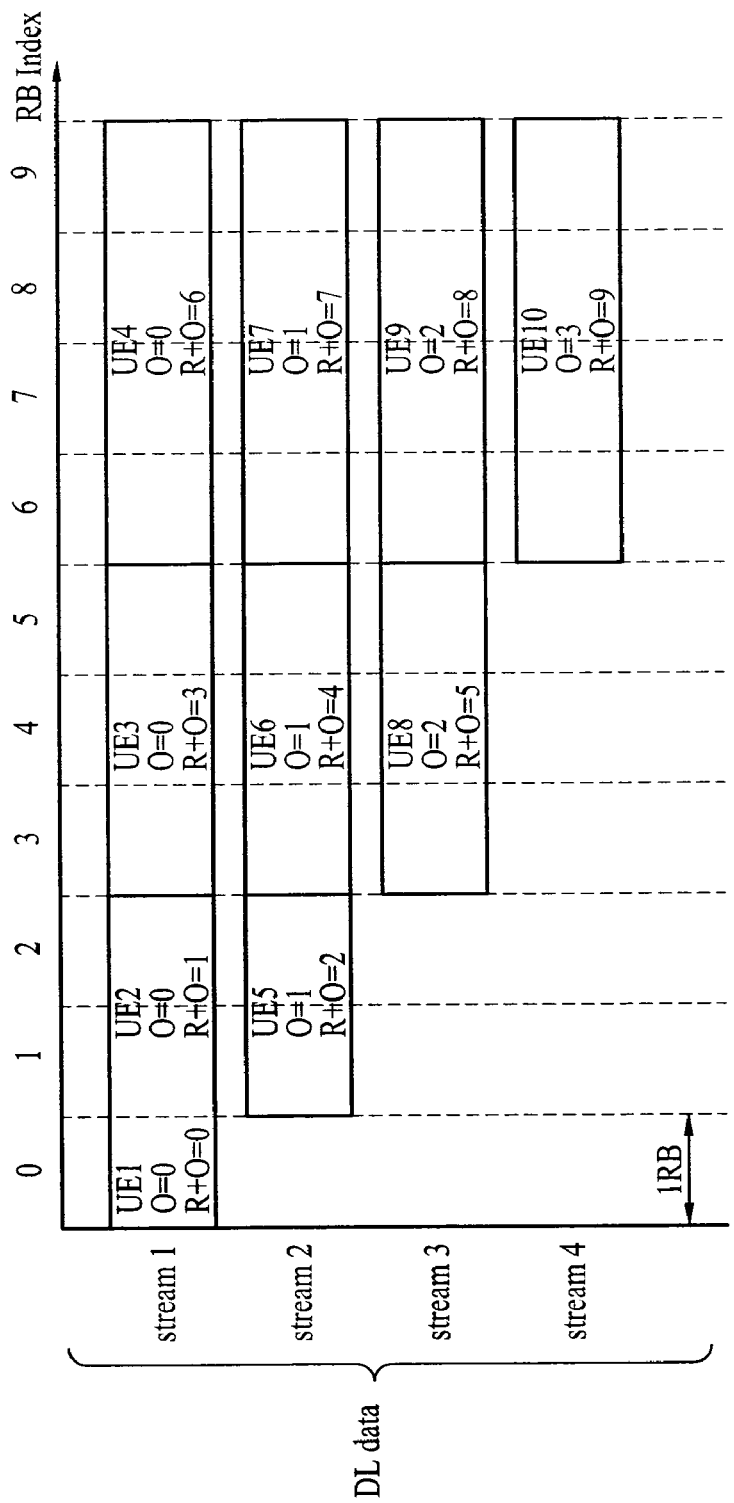
FIG. 12 illustrates a method in which an offset index is additionally used according to another embodiment of the invention.

Here, it is assumed that the transmitting and receiving sides receive information indicating that the offset index is $I_{offset}$ or already have the information according to the rules previously agreed upon therebetween. Then, $I_{ACK/NACK}$ can be determined to be the sum of $I_{VRB}$ and $I_{offset}$. Alternatively, $I_{ACK/NACK}$ can be determined to be the sum of $I_{CCE}$ and $I_{offset}$. FIGS. 11 and 12 illustrate a method in which an offset index is additionally used according to an embodiment of the invention.

Examples of FIGS. 11 and 12 are described below together since this embodiment is similarly applied to the examples of FIGS. 11 and 12 with the only difference being that the two examples relate to uplink and downlink transmission, respectively. In FIGS. 11 and 12, the horizontal axis represents a Resource Block (RB) index and the vertical axis represents a codeword index.

In FIGS. 11 and 12, R values are $I_{VRB}$ or $I_{CCE}$, which are in one-to-one correspondence with VRB indexes in this embodiment. In FIGS. 9 and 11, a value of 0 is $I_{offset}$ and $I_{ACK/NACK}$ can be represented by the sum of R and 0 according to Equations 1 and 2.

As can be seen from these figures, in the case of a first terminal (UE1), $I_{ACK/NACK}$ is 0 since an offset index $I_{offset}$ is 0 and $I_{VRB}$ or $I_{CCE}$ is 0. In the case of UE2, $I_{ACK/NACK}$ is 1 since $I_{offset}$ is 0 and $I_{VRB}$ or $I_{CCE}$ is 1. In the case of UE3, $I_{ACK/NACK}$ is 2 since $I_{offset}$ is 1 and $I_{VRB}$ or $I_{CCE}$ is 1.

In the case of remaining UEs 4 to 11, $I_{ACK/NACK}$ can be inferred from $I_{offset}$ and $I_{VRB}$ or $I_{CCE}$ since $I_{offset}$ and $I_{VRB}$ or $I_{CCE}$ are known.

When a base station transmits an ACK/NACK signal by allocating an ACK/NACK index thereto using this method, it is preferable that ACK/NACK indexes not be repeatedly allocated to data transmitted from each terminal.

It is also preferable that the number of virtual unit resources allocated to transmission data be equal to or larger than the rank value according to a MIMO communication scheme applied to the communication system. This is because the number of ACK/NACK resources or indexes that can be allocated to a plurality of simultaneously transmitted data can be easily increased to the number of VRBs or CCEs allocated to transmission data.

For example, when the number of VRBs or CCEs allocated to transmission data is 4, using one of the four ACK/NACK indexes is sufficient and therefore the remaining three can be used for a plurality of data that are transmitted at the same time. That is, when the number of VRBs or CCEs is 4, it is possible to easily determine ACK/NACK indexes for up to four simultaneously transmitted data without overlapping of the ACK/NACK indexes.

Figure 13:
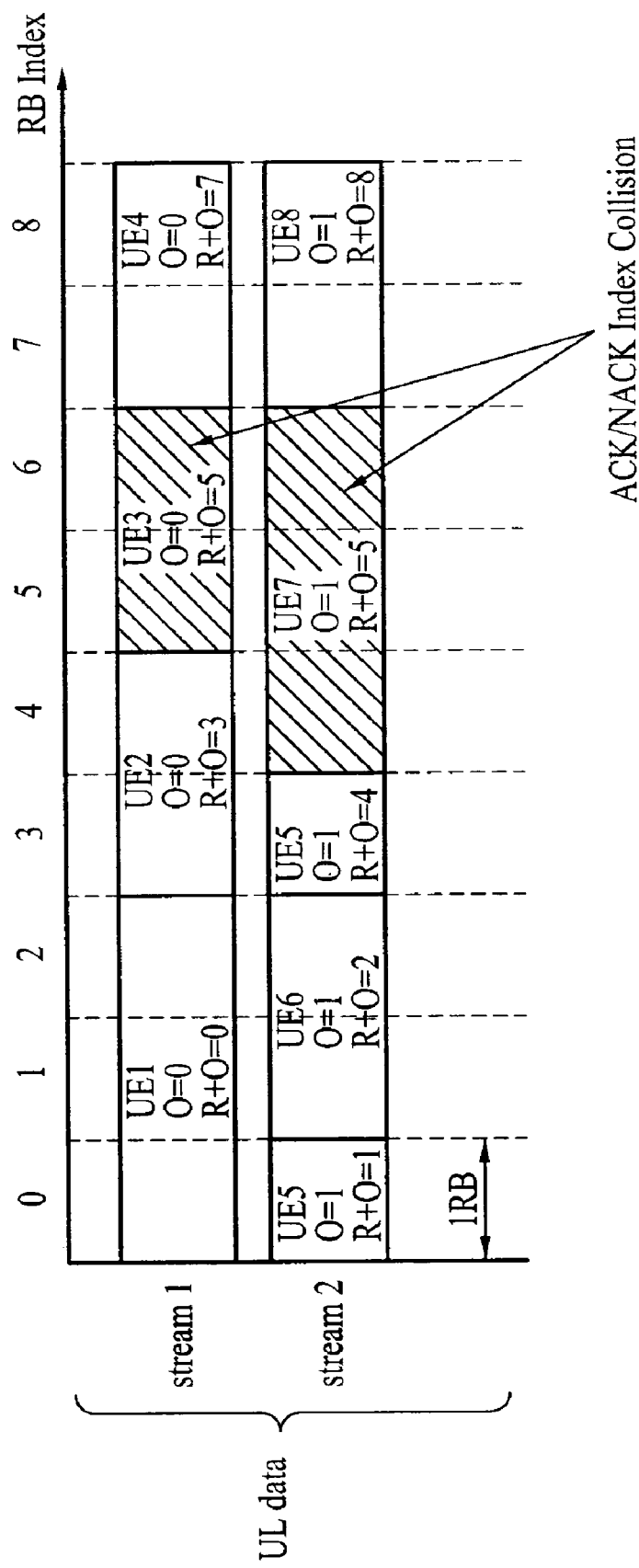
FIG. 13 illustrates an example where this embodiment of the invention is undesirably applied.

FIG. 13 illustrates an example where this embodiment of the invention is undesirably applied.

It is preferable that, when a base station performs scheduling, $I_{offset}$ of data be transmitted to prevent ACK/NACK indexes from being repeatedly allocated in the same link (uplink or downlink) in the same frame as described above.

As shown in FIG. 13, when $I_{offset}$ is determined and an ACK/NACK index is determined according to $I_{offset}$, the same ACK/NACK index may be allocated to different terminals (UEs) so that collisions may occur during ACK/NACK transmissions.

As can be seen from FIG. 13, in the case of a third terminal (UE3), $I_{ACK/NACK}$ is 5 since $I_{offset}$ is 0 and $I_{VRB}$ or $I_{CCE}$ is 5. In the case of UE7, $I_{ACK/NACK}$ is 5 since $I_{offset}$ is 1 and $I_{VRB}$ or $I_{CCE}$ is 4. That is, UE3 and UE7 will transmit ACK/NACK signals through the same ACK/NACK resources since UE3 and UE7 read the same ACK/NACK index. Accordingly, ACK/NACK signals of UE3 and UE7 will collide.

More specifically, in this method, information of an offset index can be transmitted to a terminal instead of the offset index being directly transmitted to the terminal. That is, the association is established between each offset index value and information such as control information, channel information, system information, and terminal information for use when data is transmitted from a terminal to provide offset index information to the terminal so that the terminal can infer an offset index value from the association. Reference will now be made to a method for determining an offset index value so that it can be inferred in the embodiment in which an offset index is used as additional information.

First, in an embodiment of the offset index determination method, an offset index can be determined to be a value corresponding to a pilot signal. Here, the pilot signal is an un-modulated spread spectrum signal which facilitates the terminal to obtain synchronization or base station information. This may be a Reference Signal (RS) according to the communication system to which it is applied.

In this case, when data is transmitted in uplink, information of $I_{offset}$ may be provided to the terminal instead of $I_{offset}$ being directly provided to the terminal. Specifically, an association is established between an $I_{offset}$ value and a pilot signal that the terminal will use when transmitting data. The base station notifies the terminal of a pilot signal for use when data is transmitted in uplink to allow the terminal to obtain an $I_{offset}$ corresponding to the pilot signal.

In a multi-carrier communication system, a set of pilot signals is constructed so that it is possible to select and use a pilot signal from the pilot signal set. Information of the pilot signal set can be transmitted separately. However, a set of pilot signals between the transmitting and receiving sides, pilot signals included in the pilot signal set, a pilot signal selected from the pilot signal set, a hopping rule applied when the pilot signal is selected, or the like can be previously defined for use in the system. That is, when the receiving side receives a pilot signal, the receiving side can determine a pilot signal set and a hopping rule using the pilot signal.

For example, the pilot signal can be constructed as a sequence. Here, it is assumed that a pilot signal to be transmitted together with data is used twice for each data. When a hopping rule wherein pilot signal sequence #1 in a pilot signal set is used at time t=0 and pilot signal sequence #2 is used at time t=1 is applied, pilot signal sequence #1 can be reused at time t=3 for next data transmission. In the following description, a set of pilot signals that are included in a hopping range according to the hopping rule applied to a terminal or data in this manner separately from the pilot signal set will be referred to as a pilot signal subset. Thus, the pilot signal set can include a plurality of pilot signal subsets.

Here, association (or correspondence) is established between an offset index value and every sequence that can be used as the pilot signal, and the offset index can be determined from the association. That is, when an index assigned to each pilot signal is $I_{RS}$, the offset index can be determined using $I_{RS}$ such that $I_{offset}=I_{RS}$.

If one or more pilot signals are used when data is transmitted and the one or more pilot signals are variable in a pilot signal set as described above, the offset index value can be determined through the pilot signal set information or the pilot signal subset information. Specifically, the same offset index value may be assigned to the pilot signal subsets. For example, when an index assigned to a pilot signal subset that the terminal uses for data transmission is $I_{RS}$, the offset index can be determined such that $I_{offset}=I_{RS}$.

In another method, allocated resource block information other than $I_{RS}$ can also be used to determine the offset index.

$$I_{offset}=I_{RS} \bmod N_{ARB}, \qquad \text{EQUATION 3}$$

In Equation 3, $I_{offset}$ denotes an offset index, $I_{RS}$ denotes a pilot signal or a pilot signal subset index, and N denotes the number of resource blocks or unit resources that the base station has allocated to the terminal for transmitting and receiving data. According to Equation 3, the pilot signal subset index modulo the number of resource blocks allocated to the terminal for data transmission is determined to be the offset index value. The final ACK/NACK index can be determined or inferred using this determined offset index value, for example by applying it to Equation 1 or 2.

In order to achieve spatial multiplexing of multiple terminals according to an MU-MIMO scheme, it is preferable that each terminal use different pilot signals. To allow each terminal to use a different pilot signal, the base station notifies the terminal of such pilot signal information. For example, the terminal can obtain $I_{offset}$ and ACK/NACK index information using information of a used pilot signal that can be obtained from information of the number of resource blocks N through which data is transmitted and pilot signal subset information $I_{RS}$ that are transmitted together with the data as described above.

In addition, different pilot signals can be constructed as different sequences. For example, when a pilot signal sequence is constructed as a combination of a basic sequence of a CAZAC sequence and a cyclic shift of the basic sequence, the value of offset index $I_{offset}$ can be determined taking into consideration a pattern of change with time of the cyclic shift or the cyclic shift value.

Figure 14:
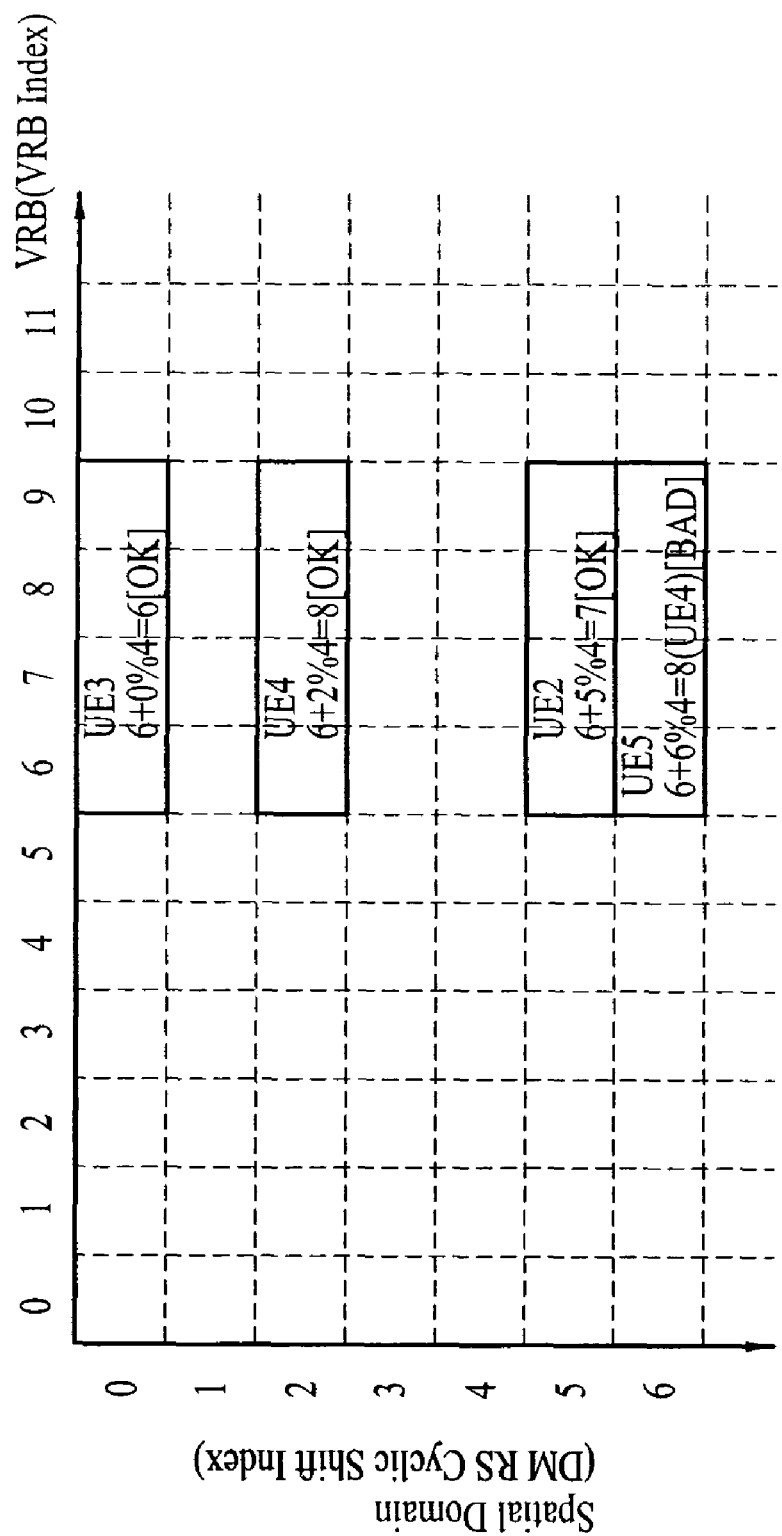
FIG. 14 illustrates a method of additionally using an offset index according to another embodiment of the invention.

FIG. 14 illustrates a method of additionally using an offset index according to another embodiment of the invention.

As shown in FIG. 14, a total of 12 VRBs are present on the horizontal axis and a total of 7 pilot signal subsets available to terminals are present on the vertical axis in this embodiment. Here, it is assumed that multiple pilot signals are used for each data of a terminal (UE) and these pilot signals constitute a pilot signal subset, and an index is allocated to each pilot signal subset.

Here, a third terminal (UE3) is allocated a total of 4 unit resources (i.e., resource blocks) corresponding to VRB indexes 4 to 9. Likewise, UEs 4, 2, and 5 are each allocated the same VRB resources as those of UE3. That is, $I_{VRB}$ is 6 and $N_{ACK}$ is 4. Each terminal is allocated a different pilot signal subset. Each terminal can determine an ACK/NACK index using a VRB index and a pilot signal subset index.

The following is an example where an ACK/NACK index is determined using Equations 1 and 3. In the case of UE3, an offset index value determined using Equation 3 is 0 (=0%4) and thus an ACK/NACK index determined using Equation 1 is 6. According to the same method, in the case of UE4, the offset index value is determined to be 2 so that the ACK/NACK index is 8. In the case of UE2, the offset index value is determined to be 1 so that the ACK/NACK index is 7. In the case of UE5, the offset index value is determined to be 2 so that the ACK/NACK index is 8.

In order to prevent collision of ACK/NACK resources, it is preferable that at least N VRB resources be allocated to achieve spatial multiplexing of N terminals. In this embodiment, the pilot signal subset index modulo the number of resource blocks allocated to terminal data is determined to be the offset index value. Therefore, it is preferable that the base station perform scheduling such that the offset index value obtained for each user through the modulo operation is unique.

In the embodiment illustrated in FIG. 14, the system can be operated without collision of ACK/NACK resources by using ACK/NACK indexes 6, 8, and 7 for UE3, UE4, and UE2, respectively. However, even though UE3 and UE5 use different pilot signal subsets, their offset values obtained through the modulo operation are equal so that their ACK/NACK indexes are identical. Therefore, if scheduling is performed in this manner, collision is expected to occur between ACK/NACK resources of UE3 and UE5.

Another embodiment of the invention is that pilot signals or pilot signal subsets are grouped into one or more groups and information of the pilot signal groups is used. For example, pilot signal subsets or pilot signals in a pilot signal set are divided into $N_{RSG}$ groups and an index is allocated to each divided group so that it can be used to determine an offset index or an ACK/NACK index. The number of pilot signal groups may be one or more and such pilot signal group information can be transmitted to a terminal.

Equations 4 and 5 illustrate examples where an offset index is determined using pilot signal group information.

$$I_{offset} = I_{RS} \bmod N_{ARB} + I_{RSG} \qquad \text{EQUATION 4}$$

$$I_{offset} = I_{RS} \bmod N_{ARB} + G(I_{RS}) \qquad \text{EQUATION 5}$$

Similar to Equation 3, $I_{offset}$ and $I_{RS}$ in Equations 4 and 5 denote an offset index and a pilot signal or a pilot signal subset index, respectively, and $N_{ARB}$ denotes the number of resource blocks or unit resources that the base station has allocated to the terminal for transmitting and receiving data. $I_{RSG}$ denotes an index of the pilot signal group described above.

In Equation 5, G( ) is a function for determining a pilot signal group index. For example, pilot signal group index information can be determined from a pilot signal or pilot signal subset index, where G( ) is a function for inferring a pilot signal group index from the pilot signal or pilot signal subset index.

As a specific embodiment, let us assume that a total of 8 pilot signal subsets are included in a pilot signal set and are grouped into pilot signal groups, each including 4 pilot signal subsets. In this case, the pilot signal subsets are grouped into a total of 2 pilot signal groups. When the number of ACK/NACK resources is twice the number of VRBs, an index $I_{RSG}$ of one of the pilot signal groups can be determined to be 0 and an index of the other pilot signal group can be determined to be equal to the total number of VRBs. In this manner, a larger number of ACK/NACK resources than the number of VRBs can be determined in the system.

Figure 15:
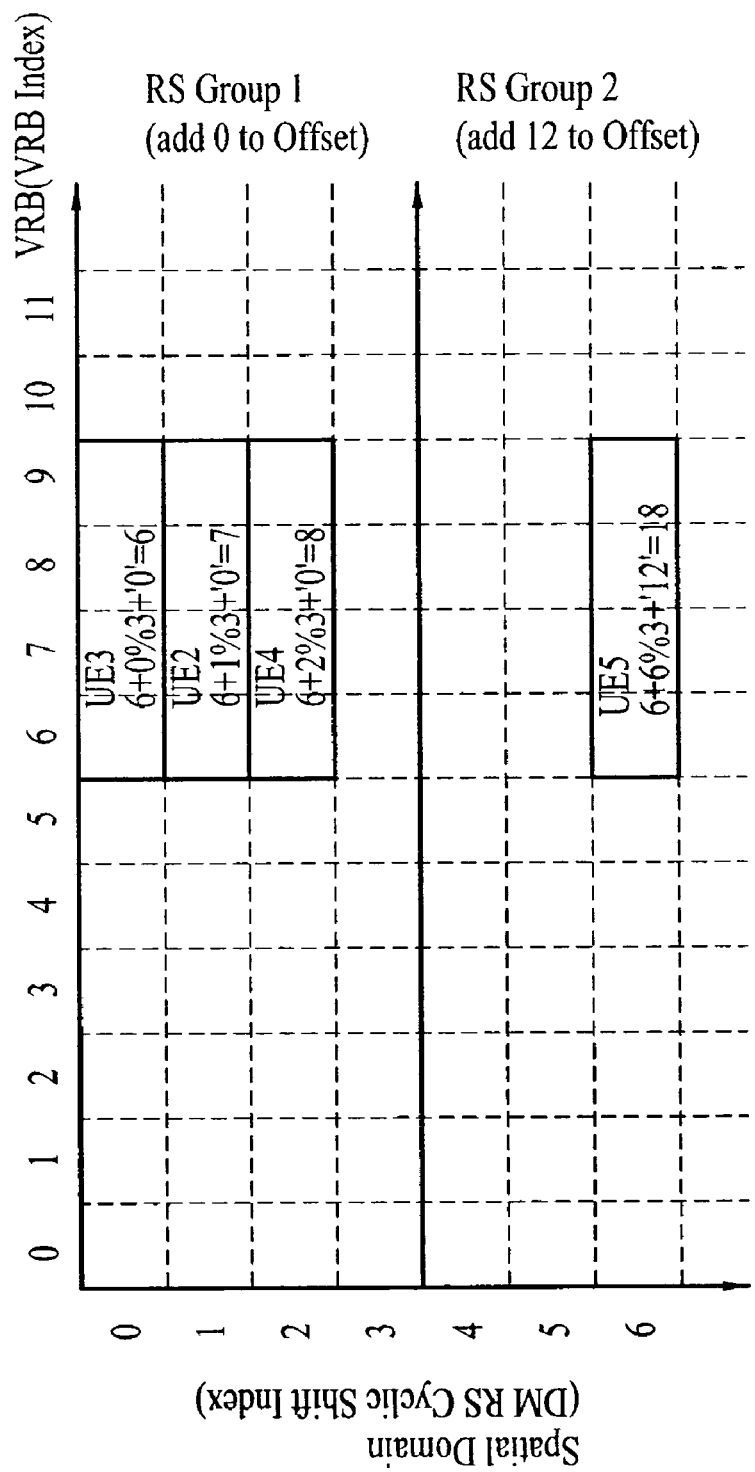
FIG. 15 illustrates a method of additionally using an offset index according to another embodiment of the invention.

FIG. 15 illustrates a method of additionally using an offset index according to another embodiment of the invention.

As shown in FIG. 15, similar to the embodiment of FIG. 14, a total of 12 VRBs are present on the horizontal axis and a total of 7 pilot signal subsets available to terminals are present on the vertical axis in this embodiment. Here, it is assumed that multiple pilot signals are used for each data of a terminal (UE) and these pilot signals constitute a pilot signal subset, and an index is allocated to each pilot signal subset.

In the case of FIG. 15, it is also assumed that a total of 7 pilot signal subsets are grouped into two pilot signal groups, and the first pilot signal group (RS Group 1) includes four pilot signal subsets of pilot signal subset indexes 0 to 3 and the second pilot signal group (RS Group 2) includes three pilot signal subsets of pilot signal subset indexes 4 to 6. In this case, 0 and 12, which is the total number of VRBs, can be allocated to the first pilot signal group and the second pilot signal group, respectively. That is, as shown in FIG. 15, the pilot signal group index of the first pilot signal group is determined to be 0, and the pilot signal group index of the second pilot signal group is determined to be 12.

Here, a third terminal (UE3) is allocated a total of 3 unit resources (i.e., resource blocks) corresponding to VRB indexes 6 to 8. Likewise, UEs 4, 2, and 5 are each allocated the same VRB resources as those of UE3. That is, $I_{VRB}$ is 6 and $N_{ACK}$ is 3. Each terminal is allocated a different pilot signal subset. Each terminal can determine an ACK/NACK index using a VRB index, a pilot signal subset index, and the pilot signal group index described above.

The following is an example where an ACK/NACK index is determined using Equations 1 and 4. In the case of UE3, an offset index value determined using Equation 4 is 0 (=0%4+0) and thus an ACK/NACK index determined using Equation 1 is 6. According to the same method, in the case of UE2, the offset index value is determined to be 1 so that the ACK/NACK index is 7. In the case of UE4, the offset index value is determined to be 2 so that the ACK/NACK index is 8. In the case of UE5, the offset index value is determined to be 12 (=6%3+12) so that the ACK/NACK index is 18. In order to allow the base station to receive a plurality of codewords transmitted from one or more terminals in uplink that are multiplexed in the same time-frequency region, it should be possible for the base station to obtain channel information of a plurality of antennas or terminals. Pilot signals can be used to notify the base station of channel information of the antennas or terminals. It is preferable that pilot signals be orthogonal to each other or that pilot signals have good cross-correlation characteristics. Therefore, when a terminal transmits data in uplink using a MIMO technique, the terminal informs the base station of a pilot signal to be used before transmitting the data.

Accordingly, this embodiment suggests a method of using a relation that is established between pilot signals, which multiple terminals use in the frequency domain through which data is transmitted, and offset indexes that affect the determination of ACK/NACK indexes. Since the pilot signal value is different for each terminal or antenna as described above, it will be effective to use the pilot signal value for the offset index value. For example, when a number is assigned to a pilot signal allocated to each terminal or antenna, its value can be determined to be $I_{offset}$.

In another embodiment of the offset index determination method, the offset index can be determined to be a value corresponding to information of a codeword corresponding to data transmitted through multiple antennas using the same time-frequency resources.

When data is transmitted according to an SU-MIMO scheme, information of a precoding matrix used for the data transmission is provided. Accordingly, the terminal can infer a codeword index of each data codeword through the used precoding matrix information and the codeword index can be used as an offset index. In this case, the base station can determine an $I_{offset}$ value from the codeword index without separately transmitting $I_{offset}$ to the terminal.

In downlink MU-MIMO, the terminal can at least determine a column vector in the precoding matrix that has been used for data transmission. That is, when a precoding matrix used by both the base station and the terminal has been predetermined, it is possible to determine the ordinal number of the column vector in the precoding matrix. Accordingly, it is possible to infer a codeword index of each data codeword and to use the codeword index as the offset index. Similar to the case of SU-MIMO, in this case, the base station can determine an $I_{offset}$ value from the codeword index without separately transmitting $I_{offset}$ to the terminal.

In this embodiment, in the case where an ACK/NACK index is determined using a codeword in a system which transmits data using a MIMO technique, the base station transmits a signal corresponding to the ordinal number of a codeword as control information when the base station allocates data to the terminal, thereby allowing the terminal to obtain a codeword index of each data.

If a precoding matrix used in the MIMO scheme is known to both the base station and the terminal and a relation is fixedly established between codewords and layers, the order of codewords corresponding respectively to a plurality of data can be determined to be the same as the order of codeword column vectors. That is, in the case where a codeword is precoded according to the MIMO technique and is transmitted through an actual physical transmit antenna, the codeword index may indicate the ordinal number of a column vector of data symbols before the codeword is mapped to a layer.

If the terminal does not know a precoding matrix used in the base station and instead knows a precoding column vector which is a part of the precoding matrix, the base station notifies the terminal of the ordinal number of the precoding column vector in the precoding matrix or of the codeword index of corresponding data, thereby allowing the terminal to transmit an ACK/NACK signal for the corresponding data.

In addition, if it is possible to determine the ordinal number of the precoding column vector applied to the data in the precoding matrix, it is possible to determine the ordinal number of a layer corresponding to the data. Then, it is possible to determine the ordinal number of a codeword corresponding to the data based on the predetermined relation between codewords and layers, thereby obtaining the codeword index.

Reference will now be made to a method in which an ACK/NACK index is determined using a combination of a VRB index and a codeword index according to another embodiment of the invention.

In the following, it is assumed that a relation is fixed between codewords and layers in a multi-carrier MIMO system. Equation 6 illustrates an example of the ACK/NACK index determination method which can be applied under this assumption.

$$I_{ACK/NACK} = \alpha \cdot I_{Codeword} + \beta \cdot I_{VRB} \quad \text{EQUATION 6}$$

In Equation 6, $I_{ACK/NACK}$ is an ACK/NACK index which is a unique number indicating a physical resource through which each available ACK/NACK signal may be transmitted or received, $I_{codeword}$ is a codeword index which is a number allocated to each codeword for transmitting data, and $I_{VRB}$ is a number corresponding to a VRB that is selected according to a specific rule from a set of VRBs through which data corresponding to a codeword is transmitted when it is assumed that VRB indexes are numbers allocated to all VRBs through which data is transmittable. For example, $I_{VRB}$ may be the smallest VRB index among VRB indexes corresponding to VRBs occupied by data corresponding to a codeword, i.e., among VRB indexes corresponding to VRBs through which the data corresponding to the codeword can be transmitted. In addition, $\alpha$ and $\beta$ are constants.

More specifically, in this embodiment, the number of resources allocated for ACK/NACK transmission is $N_{codeword}$ times the VRB index and up to $N_{codeword}$ codewords can be transmitted in the same time-frequency region. When the number of VRB indexes $I_{VRB}$ is $N_{VRB}$, the ACK/NACK index can be determined using the following Equation 7 or 8.

$$I_{ACK/NACK} = N_{VRB} \cdot I_{Codeword} + I_{VRB}, I_{Codeword} = 0, 1, 2, \ldots, N_{Codeword} - 1, I_{VRB} = 0, 1, 2, \ldots, N_{VRB} - 1 \quad \text{EQUATION 7}$$

$$I_{ACK/NACK} = I_{Codeword} + N_{codeword} \cdot I_{VRB}, I_{Codeword} = 0, 1, 2, \ldots, N_{Codeword} - 1, I_{VRB} = 0, 1, 2, \ldots, N_{VRB} - 1 \quad \text{EQUATION 8}$$

In Equations 6 to 8, $I_{VRB}$ is not necessarily in one-to-one correspondence with VRB indexes.

In addition, when data of one codeword transmitted using MIMO is transmitted in units of sets of at least M VRBs, $I_{VRB}$ may be in one-to-one correspondence with the set of VRBs. That is, if data is allocated to VRBs in units of sets of two VRBs in a MIMO system in which up to two codewords can be transmitted, one $I_{VRB}$ number is allocated to each set of two VRBs and an ACK/NACK index of an ACK/NACK resource for use by data of each codeword can be determined using $I_{codeword}$ which is a number indicating the codeword.

Reference will now be made to a method in which an ACK/NACK index is determined using a combination of a CCE index and a codeword index according to another embodiment of the invention.

In the following, it is assumed that a relation is fixed between codewords and layers in a multi-carrier MIMO system. Equation 9 illustrates an example of the ACK/NACK index determination method which can be applied under this assumption.

$$I_{ACK/NACK} = \alpha \cdot I_{Codeword} + \beta \cdot I_{CCE} \quad \text{EQUATION 9}$$

In Equation 9, $I_{ACK/NACK}$, $I_{Codeword}$, and $I_{CCE}$ are an ACK/NACK index, a codeword index, and a CCE index, respectively. Particularly, $I_{CCE}$ may correspond to a CCE included in a set of one or more CCEs occupied by control information indicating a physical resource position of transmission data. When control information is transmitted through a plurality of CCEs, $I_{CCE}$ may be a number corresponding to an index of a CCE that is selected from the plurality of CCEs according to a specific rule. For example, $I_{CCE}$ may be the smallest CCE index among CCE indexes corresponding to one or more CCEs occupied by single control information. Similar to Equation 6, $\alpha$ and $\beta$ in Equation 9 may constants.

Similar to the case where VRB indexes are used, in this embodiment, the number of resources allocated for ACK/NACK transmission is $N_{codeword}$ times the CCE index and up to $N_{codeword}$ codewords can be transmitted in the same time-frequency region. When the number of CCE indexes $I_{CCE}$ is $N_{CCE}$, the ACK/NACK index can be determined using the following Equation 10 or 11.

$$I_{ACK/NACK} = I_{CCE} \cdot I_{Codeword} + I_{CCE}, I_{Codeword} = 0, 1, 2, \ldots, N_{Codeword} - 1, I_{CCE} = 0, 1, 2, \ldots, N_{CCE} - 1 \quad \text{EQUATION 10}$$

$$I_{ACK/NACK} = I_{Codeword} + N_{codeword} \cdot I_{CCE}, I_{Codeword} = 0, 1, 2, \ldots, N_{Codeword} - 1, I_{CCE} = 0, 1, 2, \ldots, N_{CCE} - 1 \quad \text{EQUATION 11}$$

A description of Equations 10 and 11 is omitted here since it is similar to the description of Equations 6 to 8.

In another embodiment of the invention, the additional information described above can be changed according to at least one of a virtual unit resource allocated to the transmission data and a virtual unit resource allocated to control information of the transmission data.

For example, an ACK/NACK index can be obtained by analyzing the $I_{offset}$ value, which is one example of the additional information, differently according to a VRB index of a VRB through which data was transmitted. This can be represented by Equation 12 as follows.

$$I_{ACK/NACK} = O(I_{offset}) + I_{VRB}, I_{VRB} = 0, 1, 2, \ldots, N_{VRB} - 1 \quad \text{EQUATION 12}$$

In Equation 12, $O()$ can be considered a function for analyzing the $I_{offset}$ value differently according to a VRB index of a VRB through which data was transmitted. The function $O()$ can be predetermined by both the base station and the terminal.

For example, the smallest of an array of VRB indexes of all VRBs occupied by data transmitted according to codewords is subtracted from each of the VRB indexes. Each VRB index included in the array of subtracted VRB indexes is referred to as a VRB differential index. In addition, it is assumed that a codeword index is used as an $I_{offset}$ value. Here, an input of the function $O()$ may be a value indicating the ordinal number of the VRB differential index in the array and an output of the function $O()$ may be a value indicated by the input among the values of the VRB differential index in the array. Here, similar to the above embodiments, $I_{VRB}$ represents the smallest of the VRB indexes of VRBs through which codewords were transmitted.

Even when multiple codewords are transmitted through the same frequency-time region using the MIMO scheme, the amount of ACK/NACK resources required for this will not be increased compared to when no MIMO scheme is applied if the number of VRBs through which MIMO-multiplexed codewords are transmitted is limited so that it is always larger than a rank value applied to MIMO multiplexing.

Here, the $I_{offset}$ value can naturally be determined using a variety of methods including not only the method of using a codeword index described above but also the method of using a pilot signal described above with reference to Equations 3 to 5.

An embodiment in which offset index values are changed according to VRB indexes will now be described with reference to FIGS. 16 and 17.

Figure 16:
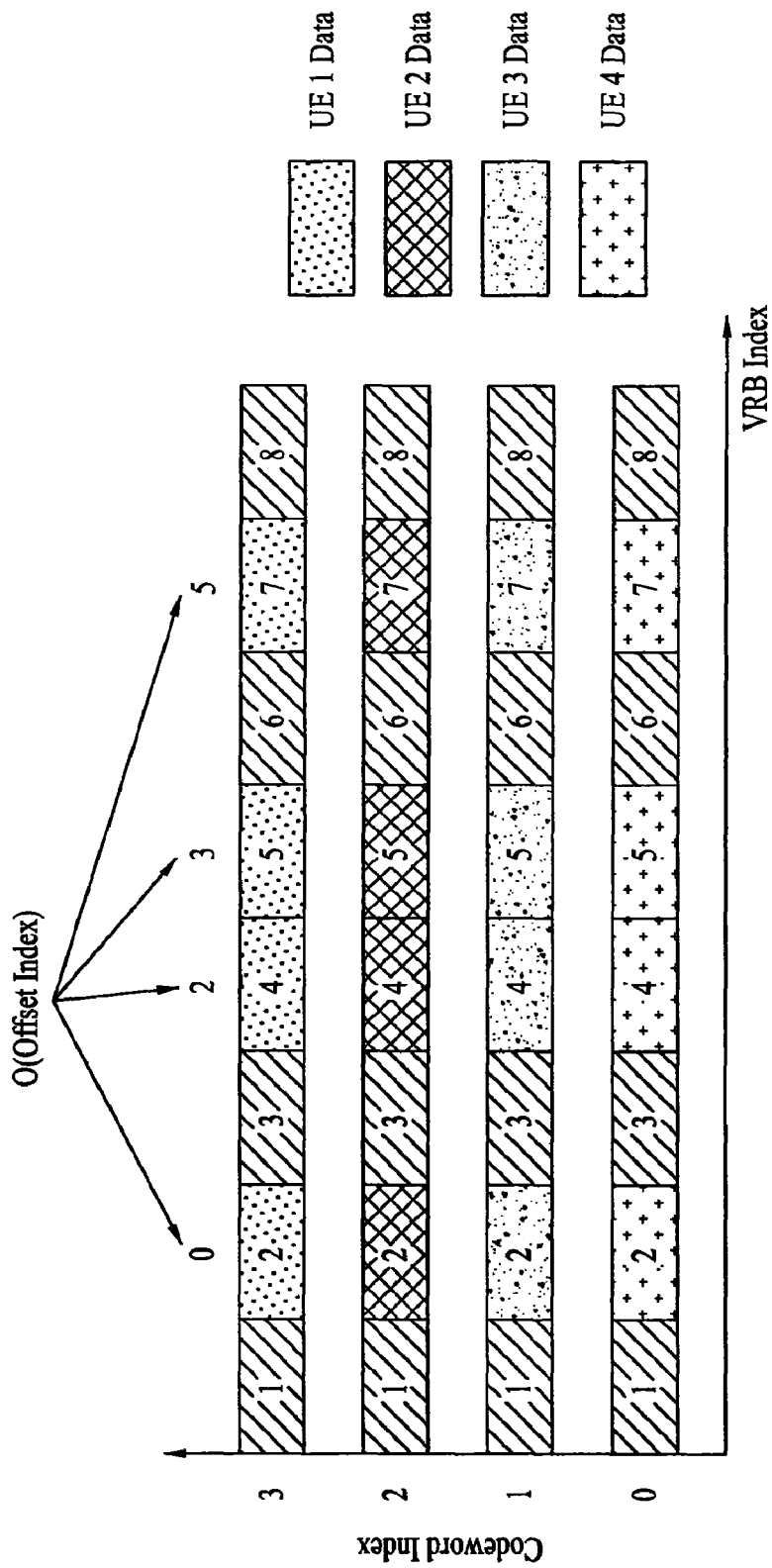
FIG. 16 illustrates an example method for determining an ACK/NACK index according to another embodiment of the invention.

FIG. 16 illustrates an example of the ACK/NACK index determination method according to another embodiment of the invention.

In the example of FIG. 16, it is assumed that one codeword is transmitted to each different terminal and each codeword is transmitted through VRB indexes 2, 4, 5, and 7 and the offset index is identical to the codeword index. Here, the $I_{VRB}$ value of every terminal is 2.

It is also assumed that $O()$ is a function that outputs a value corresponding to a VRB differential index as described above. First, the smallest VRB index 2 is subtracted from the VRB indexes 2, 4, 5, and 7 to calculate VRB differential indexes. The calculated VRB differential indexes are 0, 2, 3, and 5. Thus, $O(I_{offset})$ is 0 if the offset index value is 0, 2 if the offset index value is 1, 3 if the offset index value is 2, and 5 if the offset index value is 3.

With reference to Equation 12, the ACK/NACK index of UE1 is determined to be 7 (=5+2), the ACK/NACK index of UE2 is determined to be 5 (=3+2), the ACK/NACK index of UE3 is determined to be 4 (=2+2), and the ACK/NACK index of UE4 is determined to be 2 (=0+2).

Figure 17:
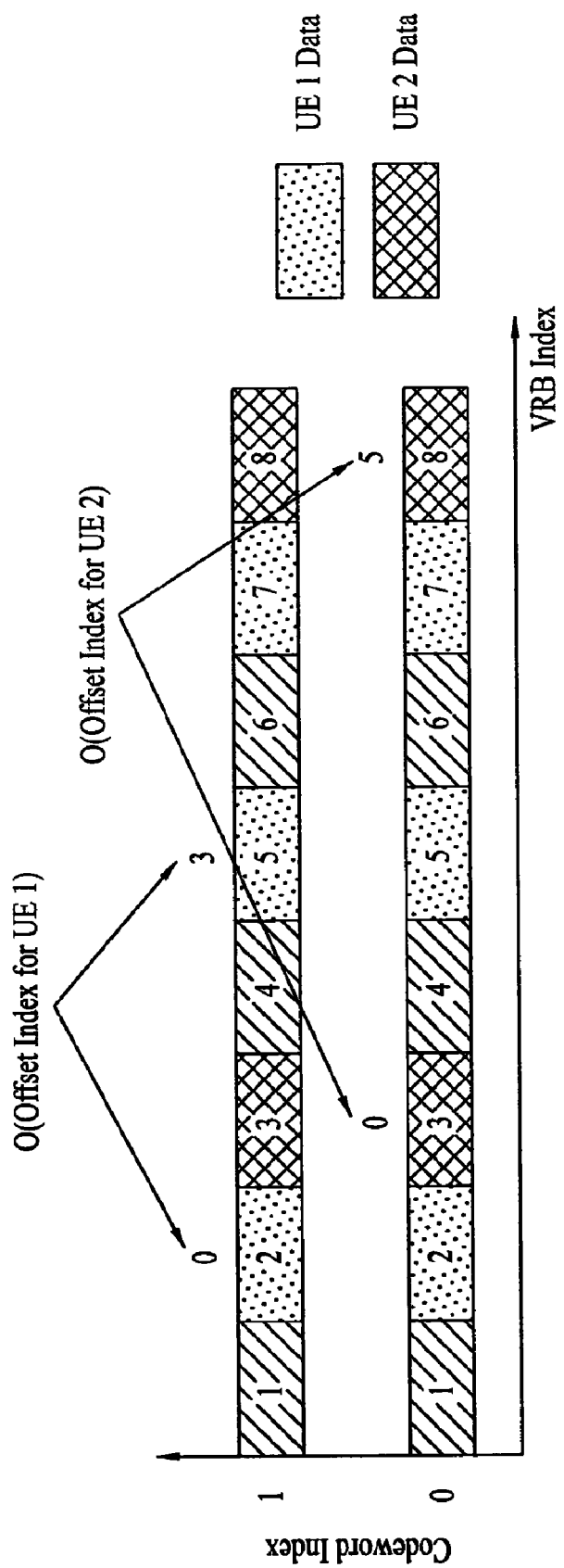
FIG. 17 illustrates an example method for determining an ACK/NACK index according to another embodiment of the invention.

FIG. 17 illustrates an example of the ACK/NACK index determination method according to another embodiment of the invention.

In the example of FIG. 17, it is assumed that two codewords are transmitted to different terminals, and data is transmitted to UE1 through VRB indexes 2, 5, and 7 and data is transmitted to UE2 through VRB indexes 3 and 8. It is also assumed that the offset index is identical to the codeword index. Here, the $I_{VRB}$ value of UE1 is 2 and the $I_{VRB}$ value of UE2 is 3.

It is also assumed that $O()$ is a function that outputs a value corresponding to a VRB differential index as described above. First, the smallest VRB index 2 is subtracted from the VRB indexes 2, 5, and 7 of UE1 to calculate VRB differential indexes. The calculated VRB differential indexes are 0, 3, and 5. Likewise, the smallest VRB index 3 is subtracted from the VRB indexes 3 and 8 of UE2 to calculate VRB differential indexes. The calculated VRB differential indexes are 0 and 5.

With reference to Equation 12, in the case of UE1, an ACK/NACK index corresponding to data corresponding to the codeword index 0 is determined to be 2 (=0+2) and an ACK/NACK index corresponding to data corresponding to the codeword index 1 is determined to be 5 (=3+2). In the case of UE2, an ACK/NACK index corresponding to data corresponding to the codeword index 0 is determined to be 3 (=0+3) and an ACK/NACK index corresponding to data corresponding to the codeword index 1 is determined to be 8 (=5+3).

The above embodiments of the present disclosure have been described focusing on the data communication relationship between a terminal (UE) and a base station. The base station is a terminal node in a network which performs communication directly with the terminal. Specific operations which have been described as being performed by the base station may also be performed by upper nodes as needed. That is, it will be apparent to those skilled in the art that the base station or any other network node may perform various operations for communication with terminals in a network including a number of network nodes. The term "base station" may be replaced with another term such as "fixed station", "Node B", "eNode B (eNB)", or "aCCEss point". The term "terminal" may also be replaced with another term such as "user equipment (UE)", "mobile station (MS)", "mobile station (MS)", or "mobile subscriber station (MSS)".

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention can be applied to mobile communication systems, cellular mobile communication systems, cellular multi-carrier systems, etc.

The invention claimed is:

1. A method of receiving an ACK/NACK (Acknowledgement/Negative ACK) signal from a network node in a mobile communication system, the method comprising:
   receiving from the network node control information for uplink resource allocation, the control information including resource block allocation information and information for reference signal;
   transmitting to the network node a data by using at least one resource block indicated by the resource block allocation information; and
   receiving from the network node an ACK/NACK signal of the data,
   wherein a resource index for the ACK/NACK signal is identified by using the information for reference signal and an index related with a resource block of the at least one resource block.

2. The method of claim 1, wherein the resource index for the ACK/NACK signal is identified by using a sum of the index related with the at least one resource block and a value indicated by the information for reference signal.

3. The method of claim 1, wherein the index related with the at least one resource block is a lowest index among at least one resource block index indicated by the resource block allocation information.

4. The method of claim 1, wherein the information for reference signal is used for indicating a cyclic shift value of demodulation reference signal (DMRS) for the data.

5. The method of claim 1, wherein the control information for the uplink resource allocation is received via at least one control channel element (CCE) which is mapped to first n orthogonal frequency division multiplexing (OFDM) symbol(s) in a subframe.

6. The method of claim 1, wherein the ACK/NACK signal is received via first n orthogonal frequency division multiplexing (OFDM) symbol(s) in a subframe.

7. A method of transmitting an ACK/NACK (Acknowledgement/Negative ACK) signal to a user equipment in a mobile communication system, the method comprising:
   transmitting to the user equipment control information for uplink resource allocation, the control information including resource block allocation information and information for reference signal;
   receiving from the user equipment data by using at least one resource block indicated by the resource block allocation information; and
   transmitting to the user equipment an ACK/NACK signal of the data,
   wherein a resource index for the ACK/NACK signal is identified by using the information for reference signal and an index related with a resource block of the at least one resource block.

8. The method of claim 7, wherein the resource index for the ACK/NACK signal is identified by using a sum of the index related with the at least one resource block and a value indicated by the information for reference signal.

9. The method of claim 7, wherein the index related with the at least one resource block is a lowest index among at least one resource block index indicated by the resource block allocation information.

10. The method of claim 7, wherein the information for reference signal is used for indicating a cyclic shift value of demodulation reference signal (DMRS) for the data.

11. The method of claim 7, wherein the control information for the uplink resource allocation is transmitted via at least one control channel element (CCE) which is mapped to first n orthogonal frequency division multiplexing (OFDM) symbol(s) in a subframe.

12. The method of claim 7, wherein the ACK/NACK signal is transmitted via first n orthogonal frequency division multiplexing (OFDM) symbol(s) in a subframe.

13. A user equipment (UE) for receiving an ACK/NACK (Acknowledgement/Negative ACK) signal from a network node in a mobile communication system, the UE comprising:
   a memory unit; and
   a processor,
   wherein the processor is configured to receive from the network node control information for uplink resource allocation, the control information including resource block allocation information and information for reference signal, configured to transmit to the network node a data by using at least one resource block indicated by the resource block allocation information, and configured to receive from the network node an ACK/NACK signal of the data, and
   wherein a resource index for the ACK/NACK signal is identified by using the information for reference signal and an index related with a resource block of the at least one resource block.

14. The UE of claim 13, wherein the resource index for the ACK/NACK signal is identified by using a sum of the index related with the at least one resource block and a value indicated by the information for reference signal.

15. The UE of claim 13, wherein the index related with the at least one resource block is a lowest index among at least one resource block index indicated by the resource block allocation information.

16. The UE of claim 13, wherein the information for reference signal is used for indicating a cyclic shift value of demodulation reference signal (DMRS) for the data.

17. The UE of claim 13, wherein the control information for the uplink resource allocation is received via at least one control channel element (CCE) which is mapped to first n orthogonal frequency division multiplexing (OFDM) symbol(s) in a subframe.

18. The UE of claim 13, wherein the ACK/NACK signal is received via first n orthogonal frequency division multiplexing (OFDM) symbol(s) in a subframe.

19. A network node for transmitting an ACK/NACK (Acknowledgement/Negative ACK) signal to a user equipment in a mobile communication system, the network node comprising:
    a memory unit; and
    a processor,
    wherein the processor is configured to transmit to the user equipment control information for uplink resource allocation, the control information including resource block allocation information and information for reference signal, configured to receive from the user equipment data by using at least one resource block indicated by the resource block allocation information, and configured to transmit to the user equipment an ACK/NACK signal of the data,
    wherein a resource index for the ACK/NACK signal is identified by using the information for reference signal and an index related with a resource block of the at least one resource block.

20. The network node of claim 19, wherein the resource index for the ACK/NACK signal is identified by using a sum of the index related with the at least one resource block and a value indicated by the information for reference signal.

21. The network node of claim 19, wherein the index related with the at least one resource block is a lowest index among at least one resource block index indicated by the resource block allocation information.

22. The network node of claim 19, wherein the information for reference signal is used for indicating a cyclic shift value of demodulation reference signal (DMRS) for the data.

23. The network node of claim 19, wherein the control information for the uplink resource allocation is transmitted via at least one control channel element (CCE) which is mapped to first n orthogonal frequency division multiplexing (OFDM) symbol(s) in a subframe.

24. The network node of claim 19, wherein the ACK/NACK signal is transmitted via first n orthogonal frequency division multiplexing (OFDM) symbol(s) in a subframe.

\* \* \* \* \*